(12) United States Patent
Ebling et al.

(10) Patent No.: US 7,898,480 B2
(45) Date of Patent: *Mar. 1, 2011

(54) ANTENNA

(75) Inventors: James P. Ebling, Ann Arbor, MI (US);
Gabriel M. Rebeiz, La Jolla, CA (US);
Carson White, La Jolla, CA (US)

(73) Assignee: Automotive Systems Labortaory, Inc., Farmington Hills, MI (US)

( * ) Notice: Subject to any disclaimer, the term of this patent is extended or adjusted under 35 U.S.C. 154(b) by 1005 days.

This patent is subject to a terminal disclaimer.

(21) Appl. No.: 11/382,011

(22) Filed: May 5, 2006

(65) Prior Publication Data

US 2007/0001918 A1    Jan. 4, 2007

Related U.S. Application Data

(60) Provisional application No. 60/594,783, filed on May 5, 2005.

(51) Int. Cl.
*H01Q 1/38* (2006.01)

(52) U.S. Cl. .............................. 343/700 MS; 343/753; 343/810

(58) Field of Classification Search ........................ None
See application file for complete search history.

(56) References Cited

U.S. PATENT DOCUMENTS

| | | | |
|---|---|---|---|
| 3,170,158 A | 2/1965 | Rotman et al. |
| 3,713,163 A | 1/1973 | Keller et al. |
| 3,754,270 A | 8/1973 | Thies |
| 3,761,936 A | 9/1973 | Archer et al. |
| 3,984,840 A | 10/1976 | Dell-Imagine |
| 4,087,822 A | 5/1978 | Maybell et al. |
| 4,222,054 A | 9/1980 | Capps |
| 4,268,831 A | 5/1981 | Valentino et al. |
| 4,288,795 A | 9/1981 | Shelton |
| 4,348,678 A | 9/1982 | Thomas |
| 4,381,509 A | 4/1983 | Rotman et al. |
| 4,641,144 A | 2/1987 | Prickett |
| 4,845,507 A | 7/1989 | Archer et al. |
| 4,905,014 A | 2/1990 | Gonzalez et al. |
| 4,983,237 A | 1/1991 | Alfing |
| 5,099,253 A | 3/1992 | Archer |
| 5,274,389 A | 12/1993 | Archer et al. |
| 5,347,287 A | 9/1994 | Speciale |

(Continued)

FOREIGN PATENT DOCUMENTS

EP     0 483 686 B1    4/1996

(Continued)

OTHER PUBLICATIONS

Office Action in U.S. Appl. No. 11/931,625, Mailed on Feb. 13, 2009, including List of references cited by examiner, Search information and Examiner's search strategy and results, 12 pp.

(Continued)

*Primary Examiner*—Trinh V Dinh
(74) *Attorney, Agent, or Firm*—Raggio & Dinnin, P.C.

(57) ABSTRACT

An antenna comprises a dielectric material having first and second surfaces, a discrete lens array operatively coupled to the first surface, and at least one broadside feed antenna operatively coupled to the second surface.

38 Claims, 11 Drawing Sheets

U.S. PATENT DOCUMENTS

| | | | |
|---|---|---|---|
| 5,446,470 | A | 8/1995 | Avignon et al. |
| 5,451,969 | A | 9/1995 | Toth et al. |
| 5,455,589 | A | 10/1995 | Huguenin et al. |
| 5,455,594 | A | 10/1995 | Blasing et al. |
| 5,486,832 | A | 1/1996 | Hulderman |
| 5,583,511 | A | 12/1996 | Hulderman |
| 5,680,139 | A | 10/1997 | Huguenin et al. |
| 5,821,908 | A | 10/1998 | Sreenivas |
| 5,874,915 | A | 2/1999 | Lee et al. |
| 5,877,726 | A | 3/1999 | Kudoh et al. |
| 5,892,487 | A | 4/1999 | Fujimoto et al. |
| 5,894,288 | A | 4/1999 | Lee et al. |
| 5,933,109 | A | 8/1999 | Tohya et al. |
| 5,959,578 | A | 9/1999 | Kreutel, Jr. |
| 5,963,172 | A | 10/1999 | Pfizenmaier et al. |
| 5,982,326 | A | 11/1999 | Chow et al. |
| 6,031,483 | A | 2/2000 | Urabe et al. |
| 6,031,501 | A | 2/2000 | Rausch et al. |
| 6,034,641 | A | 3/2000 | Kudoh et al. |
| 6,037,894 | A | 3/2000 | Pfizenmaier et al. |
| 6,043,772 | A | 3/2000 | Voigtlaender et al. |
| 6,052,086 | A | 4/2000 | Kudoh et al. |
| 6,081,239 | A | 6/2000 | Sabet et al. |
| 6,104,343 | A | 8/2000 | Brookner et al. |
| 6,137,434 | A | 10/2000 | Tohya et al. |
| 6,157,621 | A | 12/2000 | Brown et al. |
| 6,198,449 | B1 | 3/2001 | Muhlhauser et al. |
| 6,317,094 | B1 | 11/2001 | Wu et al. |
| 6,362,788 | B1 | 3/2002 | Louzir |
| 6,424,319 | B2 | 7/2002 | Ebling et al. |
| 6,426,814 | B1 | 7/2002 | Berger et al. |
| 6,545,647 | B1 | 4/2003 | Sievenpiper et al. |
| 6,590,544 | B1 | 7/2003 | Filipovic |
| 6,606,077 | B2 | 8/2003 | Ebling et al. |
| 6,822,622 | B2 | 11/2004 | Crawford et al. |
| 6,867,741 | B2 | 3/2005 | Schaffner et al. |
| 6,897,819 | B2 | 5/2005 | Henderson et al. |
| 6,982,676 | B2 | 1/2006 | Sievenpiper et al. |
| 7,042,420 | B2 | 5/2006 | Ebling et al. |
| 7,075,485 | B2 | 7/2006 | Song et al. |
| 7,227,501 | B2 | 6/2007 | Lange |
| 7,358,913 | B2 * | 4/2008 | Ebling et al. ............ 343/753 |
| 7,411,542 | B2 | 8/2008 | O'Boyle |
| 7,605,768 | B2 * | 10/2009 | Ebling et al. ............ 343/754 |
| 2002/0003505 | A1 | 1/2002 | Ebling et al. |
| 2003/0006941 | A1 | 1/2003 | Ebling et al. |
| 2004/0108963 | A1 | 6/2004 | Clymer et al. |
| 2005/0219126 | A1 | 10/2005 | Rebeiz et al. |
| 2006/0028386 | A1 | 2/2006 | Ebling et al. |

FOREIGN PATENT DOCUMENTS

| | | | |
|---|---|---|---|
| EP | 0 427 470 | B1 | 9/1996 |
| GB | 2331185 | A | 5/1999 |
| WO | 92/13373 | A1 | 8/1992 |
| WO | 2008/061107 | A2 | 5/2008 |
| WO | 2008/061107 | A3 | 5/2008 |

OTHER PUBLICATIONS

Siegel et al., "The Dielectric-Filled Parabola: A New Millimeter/Submillimeter Wavelength Receiver/Transmitter Front End," IEEE Transactions on Antennas and Propagation, vol. 39, No. 1, Jan. 1991, pp. 40-47.

Gouker et al., "A Millimeter-Wave Integrated-Circuit Antenna Based on the Fresnel Zone Plate," IEEE Transactions on Microwave Theory and Techniques, vol. 40, No. 5, May 1992, pp. 968-977.

Schoenberg et al., "Two-Level Power Combining Using a Lens Amplifier," IEEE Transactions on Microwave Theory and Techniques, vol. 42, No. 12, Dec. 1994, pp. 2480-2485.

Hollung et al., "A Bi-Directional Quasi-Optical Lens Amplifier", IEEE Transactions on Microwave Theory and Techniques, vol. 45, No. 12, Dec. 1997, pp. 2352-2357.

Popovic et al.,"Quasi-Optical Transmit/Receive Front Ends", IEEE Transactions on Microwave Theory and Techniques, vol. 46, No. 11, Nov. 1998, pp. 1964-1975.

Wu et al., "Design and Characterization of Single and Multiple Beam MM-Wave Circularly Polarized Substrate Lens Antennas for Wireless Communications," IEEE Antennas and Propagation Society International Symposium, 1999 Digest, APS, Orlando, Florida, Jul. 11-16, 1999, New York, NY : IEEE, US, vol. 4, Jul. 1999, pp. 2408-2411, XP000935569, ISBN: 0-7803-5640-3.

Schoenlinner et al., "77 GHz Transceiver Module Using A Low Dielectric Constant Multilayer Structure," 30th European Microwave Conference Paris France 2.-6.10.2000, Oct. 2000, pp. 245-248.

Vian et al., "A Transmit/Receive Active Antenna with Fast Low-Power Optical Switching", IEEE Transactions on Microwave Theory and Techniques, vol. 48, No. 12, Dec. 2000, pp. 2686-2691.

Schoenlinner et al., "Spherical-Lens Antennas for Millimeter Wave Radars," European Microwave Week 2001 Proc., vol. 3, Sep. 2001, pp. 317-320.

Popovic et al., "Multibeam Antennas with Polarization and Angle Diversity", IEEE Transactions on Antennas and Propogation, vol. 50, No. 5, May 2002, pp. 651-657.

Schoenlinner et al., "Compact Multibeam Imaging Antenna for Automotive Radars," 2002 IEEE MTT-S Digest, Jun. 2002, pp. 1373-1376.

Schoenlinner et al., "Wide-Scan Spherical-Lens Antennas for Automotive Radars," IEEE Transactions on Microwave Theory and Techniques, vol. 50, No. 9, Sep. 2002, pp. 2166-2175.

Romisch et al., "Multi-Beam Discrete Lens Arrays with Amplitude Controlled Steering", IEEE International Microwave Symposium Digest, vol. 1-3, TH4B-1, Jun. 9-11, 2003, pp. 1669-1672.

Abbaspour-Tamijani et al., "An Affordable Millimter-Wave Beam Steerable Antenna Using Interleaved Planar Subarrays," IEEE Transactions on Antennas and Propagation, vol. 51, No. 9, Sep. 2003, pp. 2193-2202.

Abbaspour-Tamijani, A., "Novel Components for Integrated Millimeter-Wave Front-Ends," Ph.D. Dissertation, University of Michigan, Jan./Feb. 2004.

Schoenlinner, B., "Compact Wide Scan Angle Antennas for Automotive Applications and RF MEMS Switchable Frequency Selective Surfaces", Ph.D. Dissertation, University of Michigan, Feb. 2004.

Abbaspour-Tamijani et al.,"A planar filter-lens-array for millimeter-wave applications," 2004 AP-S Int. Symp. Dig., Monterey, CA, Jun. 2004.

PCT International Preliminary Report on Patentability under Chapter II of the PCT in International Application No. PCT/US06/17752, May 1, 2009, 14 pages.

PCT International Preliminary Report on Patentability under Chapter I of the PCT in International Application No. PCT/US07/847599, Apr. 16, 2008, 5 pages.

Pozar et al., "Scan Blindness in Infinite Phased Arrays of Printed Dipoles," IEEE Trans. Antennas Prop., vol. AP-32, No. 6, pp. 602-610, Jun. 1984.

McGrath, D. T ., "Planar Three-Dimensional Constrained Lenses," IEEE Trans. Antennas Prop., vol. AP-34, No. 1, pp. 46-50, Jan. 1986.

Pozar, D. M., "Flat lens antenna concept using aperture couples microstrip patches," Electronic Letters, vol. 32, pp. 2109-2111, Nov. 1996.

Pozar et al., "Design of Millimeter Wave Microstrip Reflectarrays," IEEE Trans. Antennas Prop., vol. 45, No. 2, pp. 287-296, Feb. 1997.

Gresham et al., "A compact manufactureable 76-77-GHz radar module for commercial ACC applications," IEEE Trans. on Microwave Theory and Techniques, vol. 49, No. 1, Jan. 2001, pp. 44-58.

Menzel et al., "A 76 GHz multiple-beam planar reflector antenna," 32nd European Microwave Conf. Proc., Sep. 2001, pp. 977-980.

Abbaspour-Tamijani et al., "AntennaFilterAntenna Arrays as a Class of Bandpass Frequency-Selective Surfaces," IEEE Trans. Microwave Theory Tech., vol. 52, No. 8, pp. 1781-1789, Aug. 2004.

Fujino et al., "A New Feeding Method for a Dual-Polarized Patch Antenna with Low Cross-Polarization Ratio," JINA 2002, Nov. 12-14, 2002, Nice, France.

Yueh et al., "Compact Dual-Frequency Dual-Polarization Microstrip Antnena Feed For Future Soil Moisture and Sea Surface Salinity Missions," Earth Science Technology Workshop, Jun. 25, 2003, presentation slides.

Suvikunnas et al., "A Novel MIMO Antenna for Laptop Type Device," Proceedings of the Antenna Measurement Techniques Association, 26th Annual Meeting and Symposium (AMTA 2004), Stone Mountain, Georgia, Oct. 17-22, 2004, pp. 118-123.

White et al.; "A wide-scan printed planar K-band microwave lens," Antennas and Propagation Society International Symposium, 2005 IEEE, vol. 4A, Jul. 3-8, 2005 pp. 313-316 vol. 4A.

PCT International Search Report and Written Opinion of International Searching Authority in International Application No. PCT/US06/17752, Feb. 21, 2007, 6 pages.

\* cited by examiner

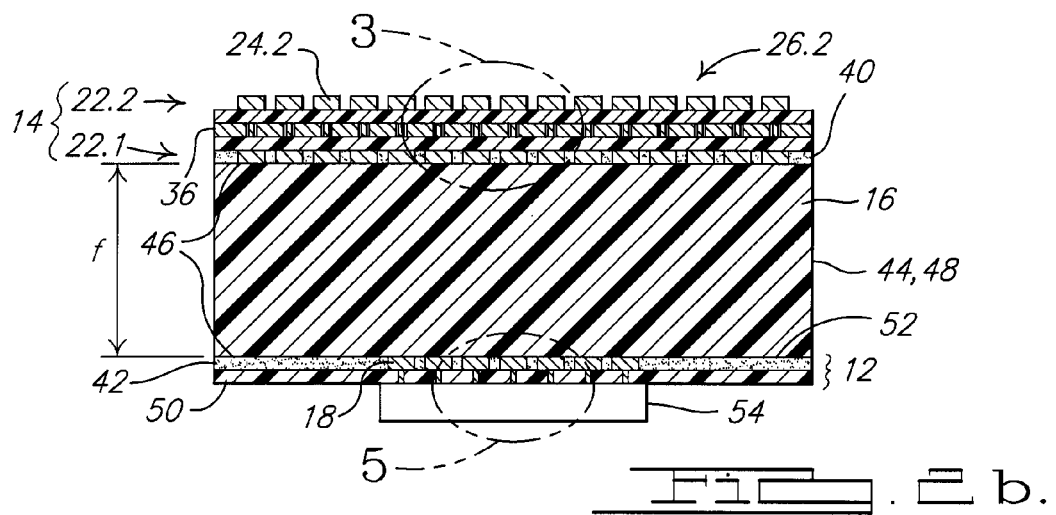
FIG. 2b.
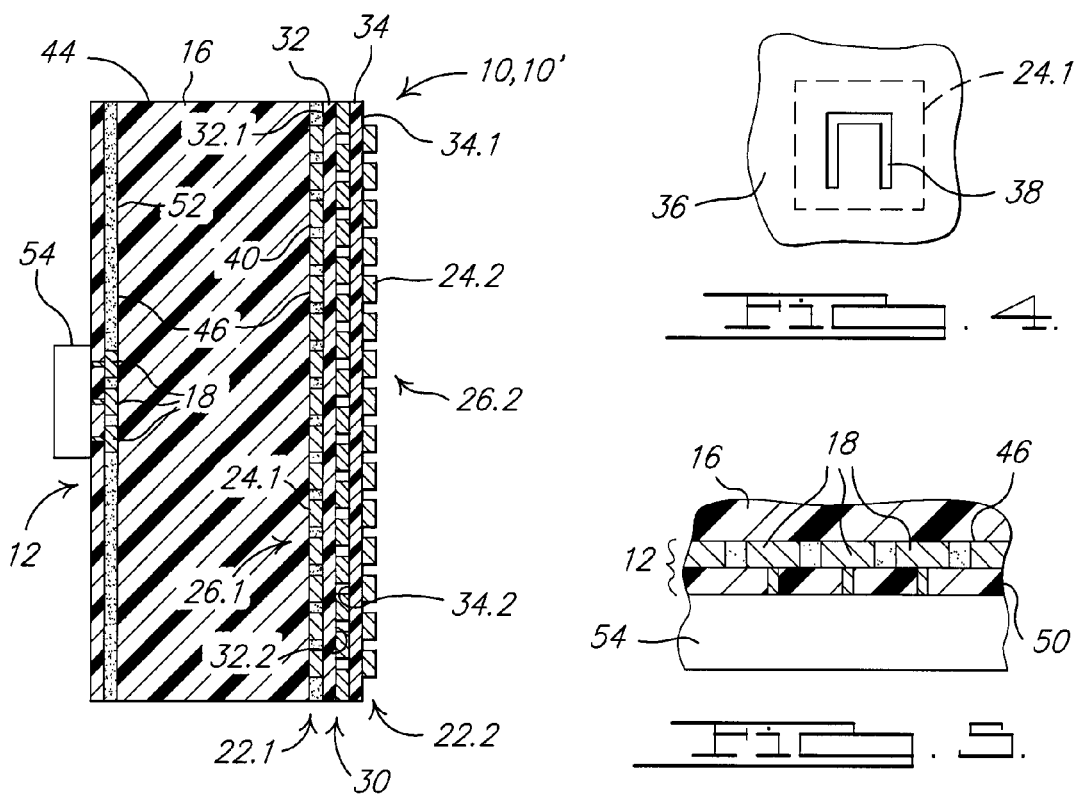
FIG. 2c.
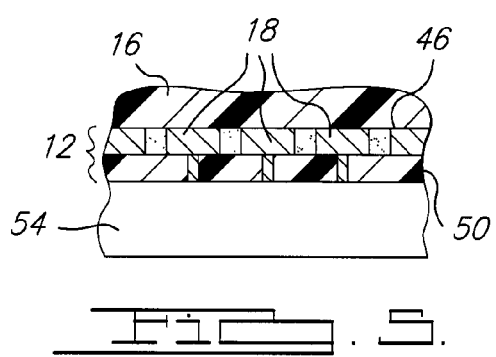
FIG. 4.
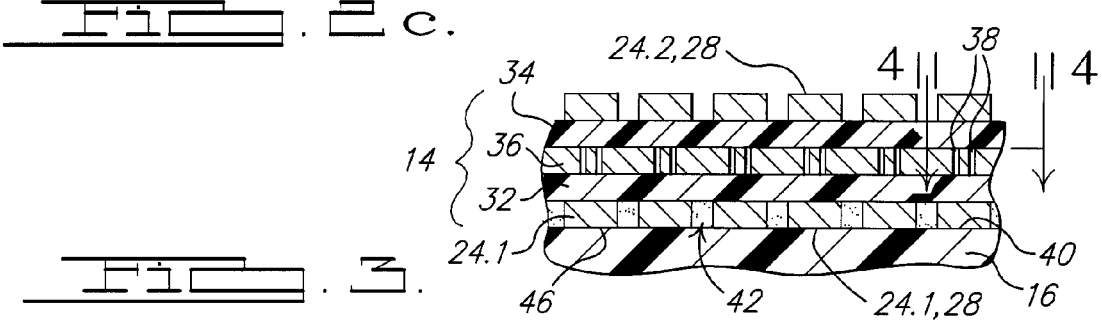
FIG. 5.
FIG. 3.

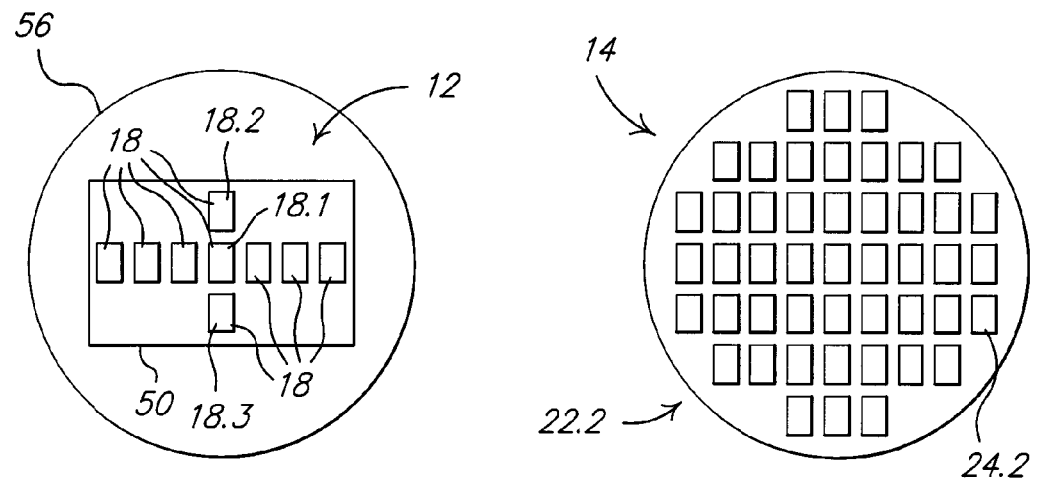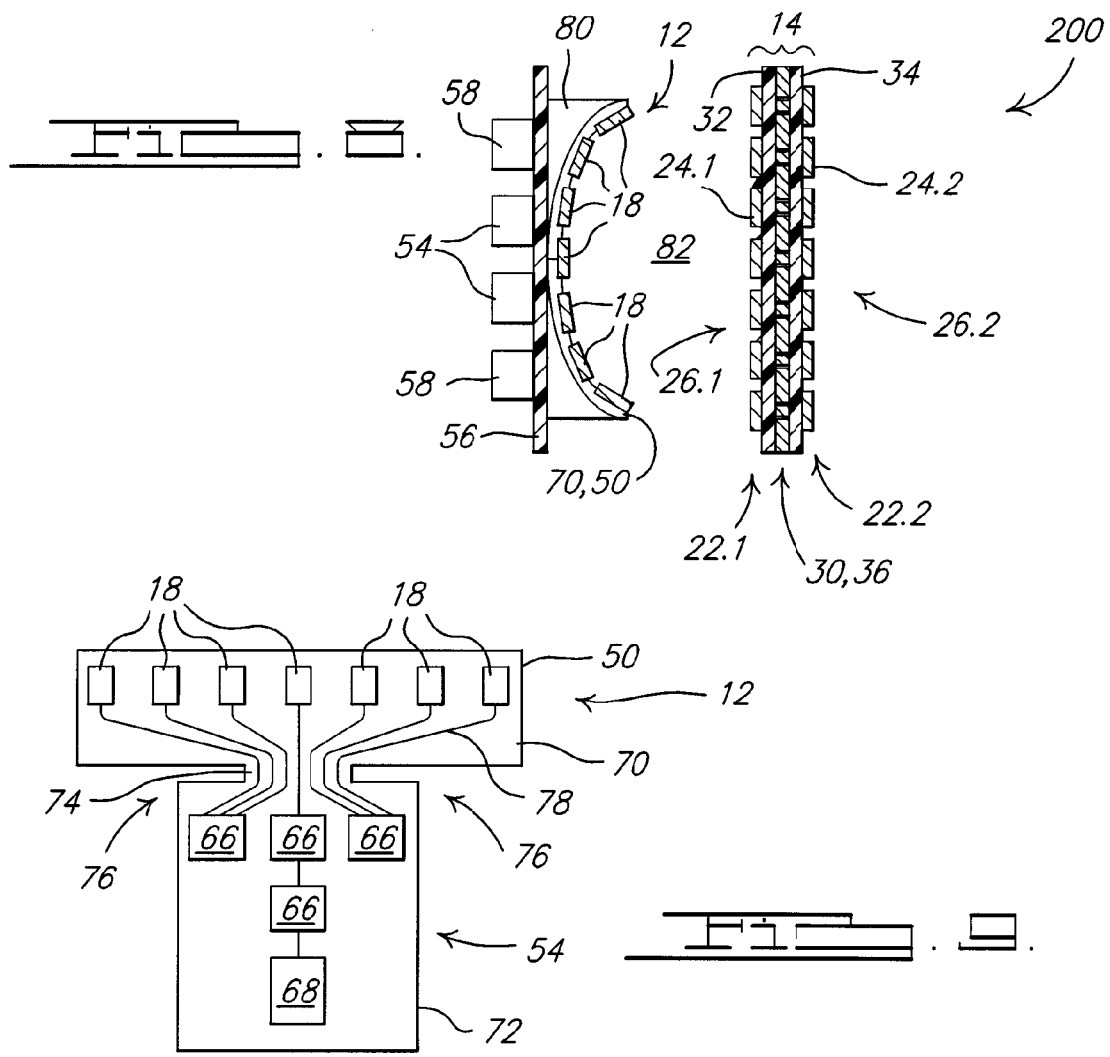

ANTENNA

CROSS-REFERENCE TO RELATED APPLICATIONS

The instant application claims the benefit of prior U.S. Provisional Application Ser. No. 60/594,783 filed on 5 May 2005, which is incorporated herein by reference. The instant application is related in part in subject matter to U.S. application Ser. No. 11/161,681, filed on 11 Aug. 2005, which claims benefit of U.S. Provisional Application No. 60/522,077 filed on 11 Aug. 2004, each of which is incorporated herein by reference.

BRIEF DESCRIPTION OF THE DRAWINGS

In the accompanying drawings:

FIGS. 2b and 2c illustrate cross-sectional views of the first embodiment of the multi-beam antenna;

FIG. 3 illustrates an expanded side view of a portion of the discrete lens array portion illustrated in FIG. 2b;

FIG. 4 illustrates an expanded cross-sectional plan view of a portion of the discrete lens array portion illustrated in FIG. 3;

FIG. 5 illustrates an expanded side view of a portion of the multi-element broadside feed array portion illustrated in FIG. 2b;

FIG. 7b illustrates a plan cross-sectional view of a multi-element broadside feed array of the second embodiment of the multi-beam antenna;

FIG. 7c illustrates a plan view of a discrete lens array of the second embodiment of the multi-beam antenna;

FIG. 8 illustrates a second aspect of a multi-beam antenna;

FIG. 9 illustrates a plan view of a multi-element broadside feed array and associated circuitry of the second aspect of the multi-beam antenna illustrated in FIG. 8;

FIG. 16 illustrates a plot of delay as a function of radial location on the planar discrete lens array illustrated in FIGS. 15a and 15b;

DETAILED DESCRIPTION OF EMBODIMENT(S)

Figure 1:
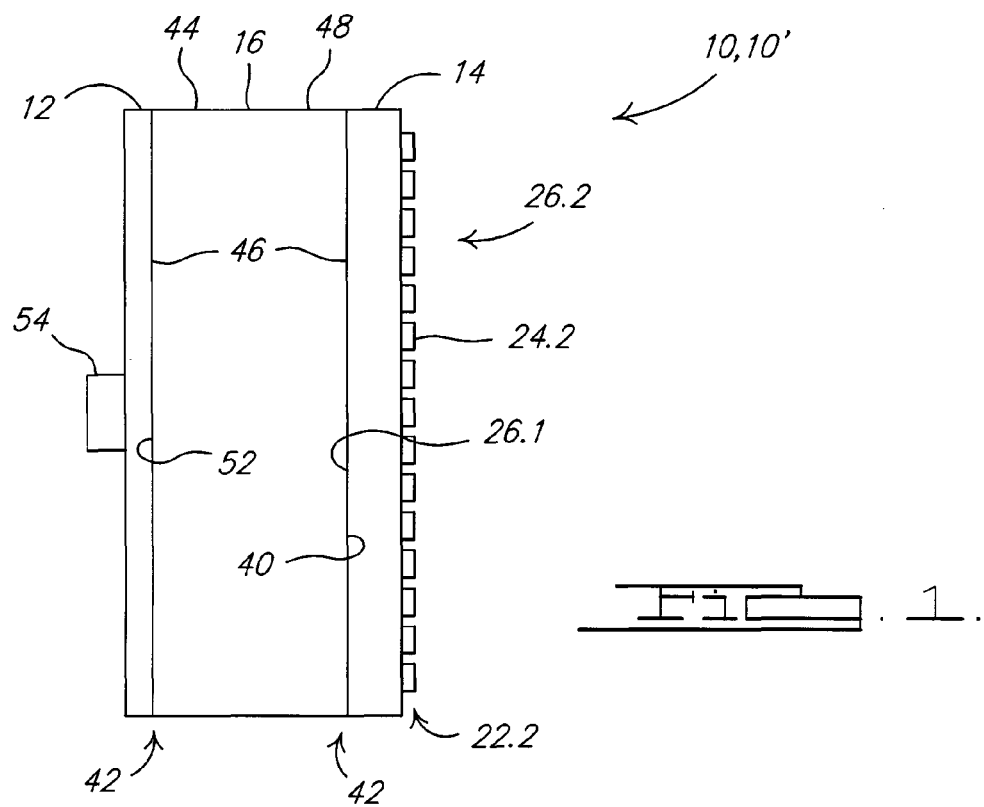
FIG. 1 illustrates a side view of a first embodiment of a multi-beam antenna.

Referring to FIGS. 1-6, a multi-beam antenna 10 comprises a multi-element broadside feed array 12 adapted to cooperate with a discrete lens array 14 through a block of dielectric material 16, wherein the multi-element broadside feed array 12 and the discrete lens array 14 are each operatively coupled to opposing sides of the block of dielectric material 16. The multi-beam antenna 10 can be adapted for operation in a transmit mode, a receive mode, or both a transmit mode and a receive mode either in sequence or simultaneously. In a transmit mode, each broadside feed antenna 18 of the multi-element broadside feed array 12 provides for generating a different beam of electromagnetic energy 20 in a different direction as focused by the discrete lens array 14. In a receive mode, each broadside feed antenna 18 of the multi-element broadside feed array 12 provides for receiving a different beam of electromagnetic energy 20 through the discrete lens array 14 from a corresponding different direction. In one embodiment, the discrete lens array 14 is located substantially along the focal plane of the discrete lens array 14, i.e. at a distance f therefrom, wherein f is equal to the focal length of the discrete lens array 14. In another embodiment, the discrete lens array 14 is located substantially along a focal surface of the discrete lens array 14, i.e. so that each of the elements of the discrete lens array 14 is substantially at a focal point of the discrete lens array 14 relative to an associated beam of electromagnetic energy 20 associated with a corresponding direction.

A first embodiment of the multi-beam antenna 10' is illustrated in FIGS. 1-6. The discrete lens array 14 comprises an assembly of a first set 22.1 of first broadside antenna elements 24.1 on a first side 26.1 of the discrete lens array 14, and a corresponding second set 22.2 of second broadside antenna elements 24.2 on a second side 26.2 of the discrete lens array 14, wherein the first 26.1 and second 26.2 sides face in opposing directions with respect to one another, and the first 24.1 and second 24.2 broadside antenna elements from the first 22.1 and second 22.2 sets are paired with one another. The first 24.1 and second 24.2 broadside antenna elements of each pair 28 are adapted to communicate with one another through an associated delay element 30, wherein the amount of delay, or phase shift, is a function of the location of the particular pair 28 of first 24.1 and second 24.2 broadside antenna elements in the discrete lens array 14 so as to emulate the behavior of an electromagnetic lens, for example, a spherical, plano-spherical, elliptical, cylindrical or plano-cylindrical lens. The delay as a function of location on the discrete lens array 14 is adapted to provide—in a transmit mode—for transforming a diverging beam of beam of electromagnetic energy 20 from an associated broadside feed antenna 18 at a focal point to a corresponding substantially collimated beam exiting the discrete lens array 14; and vice versa in a receive mode.

Figure 2A:
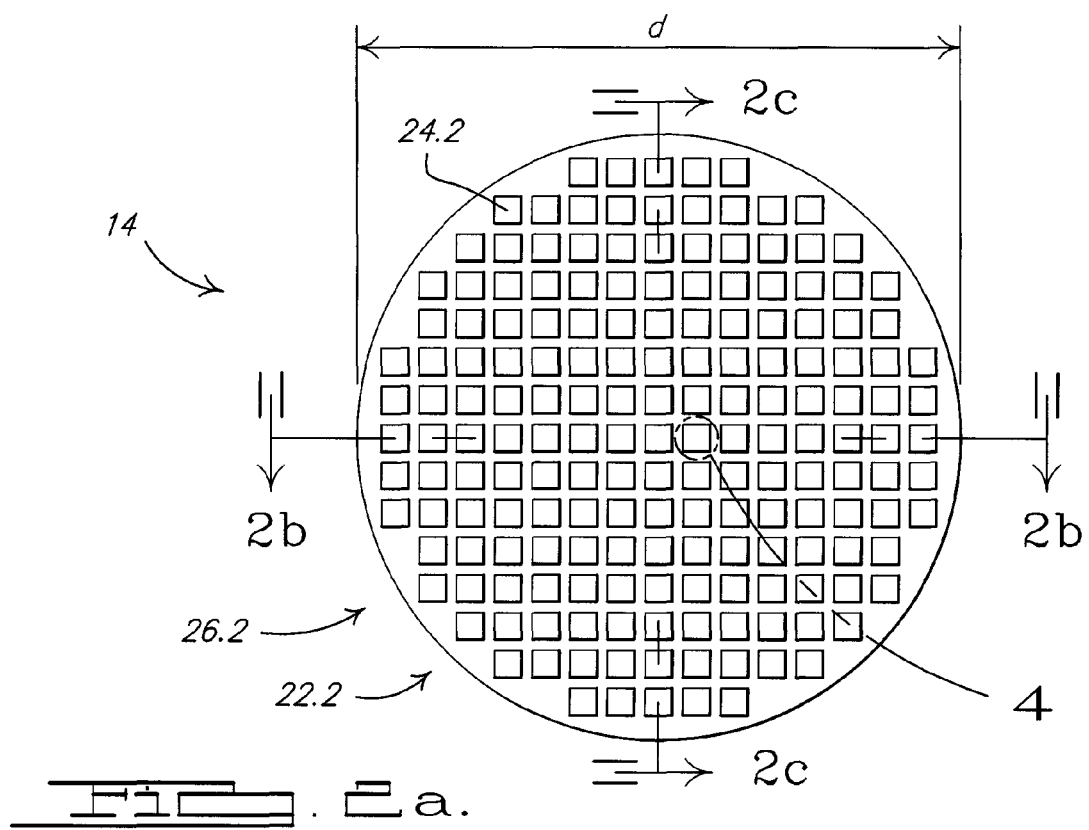
FIG. 2a illustrates a plan view of a discrete lens array of the first embodiment of the multi-beam antenna.
Figure 6:
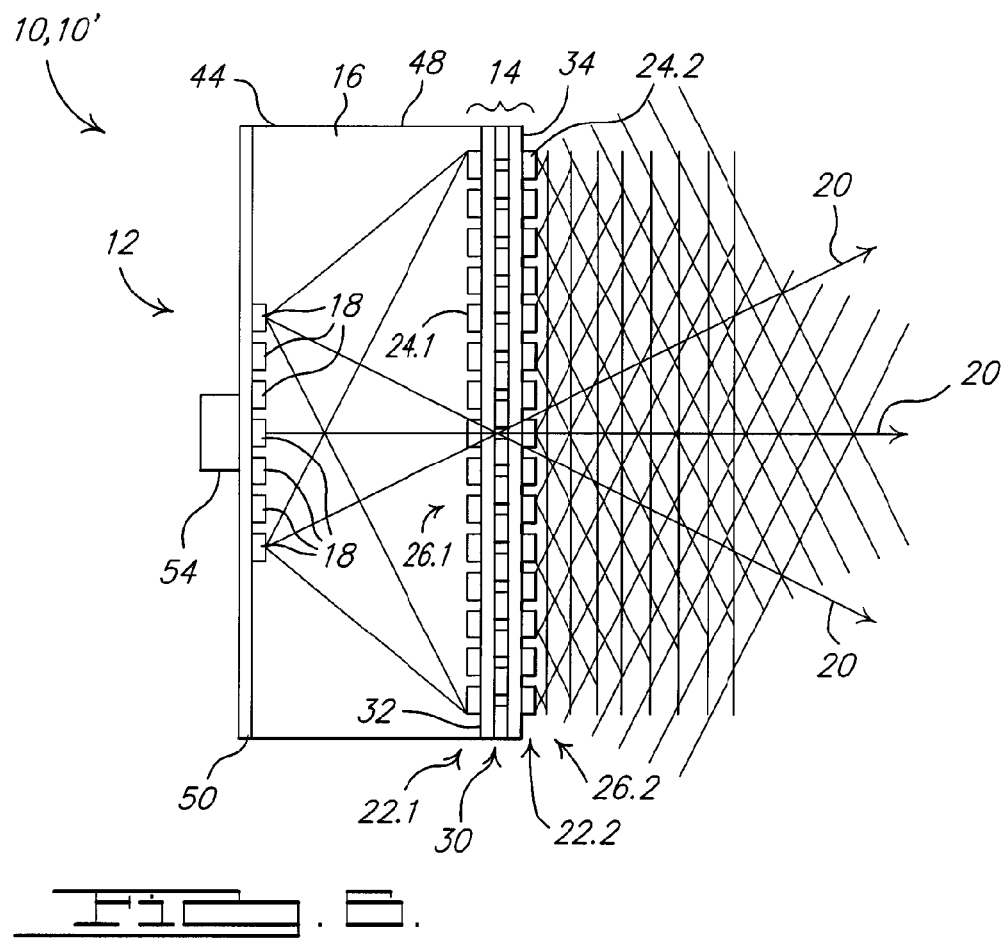
FIG. 6 illustrates an operation of the first embodiment of the multi-beam antenna.

Referring to FIGS. 2-4, in accordance a first aspect, the discrete lens array 14 comprises a first set 22.1 of first broadside antenna elements 24.1, for example, patch antenna elements, on a first side 32.1 of a first dielectric substrate 32 and a second set 22.2 of second broadside antenna elements 24.2, for example, patch antenna elements, on a first side 34.1 of a second dielectric substrate 34, with the respective second sides 32.2, 34.2 of the first 32 and second 34 dielectric substrates facing one another across opposing sides of a central conductive layer 36 that is provided with associated coupling slots 38 associated with each pair 28 of first 24.1 and second 24.2 broadside antenna elements, wherein the associated coupling slots 38 provide for communication between the first 24.1 and second 24.2 broadside antenna elements of each pair 28, and are adapted to provide for the corresponding associated delay, for example, in accordance with the technical paper, "A planar filter-lens-array for millimeter-wave applications," by A. Abbaspour-Tamijani, K. Sarabandi, and G. M. Rebeiz in 2004 *AP-S Int. Symp. Dig.*, Monterey, Calif., June 2004, which is incorporated herein by reference. For example, referring to FIG. 4, in accordance with one embodiment, the coupling slots 38 are "U-shaped"—i.e. similar to the end of a tuning fork—and in cooperation with the adjacent first 32 and second 34 dielectric substrates constitute a sandwiched coplanar-waveguide (CPW) resonant structure, wherein the associated phase delay can be adjusted by scaling the associated coupling slot 38. Accordingly, the individual pairs 28 of first 24.1 and second 24.2 broadside antenna elements in combination with an associated delay element 30 constitute a bandpass filter with radiative ports which can each be modeled as a three-pole filter based upon the corresponding three resonators of the associated first 24.1 and second 24.2 broadside antenna elements and the associated coupling slot 38.

For example, the first 32 and second 34 dielectric substrates may be constructed of a material with relatively low loss at an operating frequency, examples of which include DUROID®, a TEFLON® containing material, a ceramic material, depending upon the frequency of operation. For example, in one embodiment, the first 32 and second 34 dielectric substrates comprise DUROID® with a TEFLON® substrate of about 15-20 mil thickness and a relative dielectric constant of about 2.2, wherein the first 24.1 and second 24.2 broadside antenna elements and the coupling slots 38 are formed, for example, by subtractive technology, for example, chemical or ion etching, or stamping; or additive techniques, for example, deposition, bonding or lamination, from associated conductive layers bonded to the associated first 32 and second 34 dielectric substrates. The first 24.1 and second 24.2 broadside antenna elements may, for example, comprise microstrip patches, dipoles or slots.

The first side 26.1 of the discrete lens array 14 is bonded to a first surface 40 of the block of dielectric material 16 using a bonding agent 42, for example, having a dielectric constant substantially equal to that of the block of dielectric material 16. The first broadside antenna elements 24.1 are adapted so as to be substantially impedance-matched to the block of dielectric material 16, and the second broadside antenna elements 24.2 are adapted so as to be substantially impedance-matched to air.

The block of dielectric material 16 is adapted so as to provide for locating the multi-element broadside feed array 12 substantially along the focal plane of the discrete lens array 14. In one embodiment, the block of dielectric material 16 comprises a slab with a thickness substantially equal to the focal length f of the discrete lens array 14, for example, having an aspect ratio—given by the ratio f/D of the focal length f to the diameter D of the discrete lens array 14—greater than 0.25. For example, for a multi-beam antenna 10 with f/D of about 0.4-0.6 and an aperture diameter of about 4 inches, the corresponding thickness of the block of dielectric material 16 would be about 1.6-2.4 inches. A larger f/D provides for better scanning off-axis, but requires a thicker structure. The particular thickness of the block of dielectric material 16 for a particular application, could and typically would, for example, be calculated using ray-tracing and full-wave electromagnetic models. The block of dielectric material 16, for example, comprises a material with relatively low loss at an operating frequency, for example, a TEFLON® containing material or a ceramic material, depending upon the frequency of operation. For example, TEFLON® has been useful at microwave and mm-wave frequencies, although some other material with a similar relatively dielectric constant and a similar loss tangent would provide similar results. In one embodiment, the block of dielectric material 16 comprises a cylindrical disk 44 with parallel planar faces 46, sliced from a cylindrical rod of TEFLON®, wherein the separately fabricated multi-element broadside feed array 12 and discrete lens array 14 are respectively bonded to respective opposing parallel planar faces 46 of the cylindrical disk 44. Excessive undesirable reflections from the cylindrical side surface 48 of the cylindrical disk 44, if present, could be mitigated by rounding or angling the cylindrical side surface 48, or by incorporating quarter-wave grooves therein so a to provide for a better match to the surrounding air. Furthermore, an absorber material could be added around the cylindrical side surface 48 so as to provide for mitigating a spillover of electromagnetic energy.

Referring to FIGS. 2b, 2c, 5 and 6, the multi-element broadside feed array 12 comprises a plurality of broadside feed antenna 18 on a third dielectric substrate 50, formed, for example, by subtractive technology, for example, chemical or ion etching, or stamping; or additive techniques, for example, deposition, bonding or lamination, from an associated conductive layer bonded to the associated third dielectric substrate 50. For example, the third dielectric substrate 50 would comprise a material with relatively low loss at an operating frequency, for example, DUROID®, a TEFLON® containing material, a ceramic material, depending upon the frequency of operation. The multi-element broadside feed array 12 on the third dielectric substrate 50 is bonded with a bonding agent 42 to the second surface 52 of the block of dielectric material 16, and is substantially aligned with the center of the discrete lens array 14.

The broadside feed antennas 18 of the multi-element broadside feed array 12 are, for example, located along a linear array in the X-direction, Y-direction; located in accordance with a 2-dimensional spacing; or located in accordance with any combination therefore (ie, a cross), so as to provide for scanning in azimuth or elevation, or two dimensional scanning. For linear (e.g. 1×N, 2×N, or 3×N) and cross-arrays (N in the X; N in the Y), there would be sufficient space to integrate the associated front-end electronic components 54, e.g. transmit and receive electronics, and the switch network for the broadside feed antennas 18, with the multi-element broadside feed array 12 on the third dielectric substrate 50. For example, the broadside feed antennas 18 may comprise either dipole (or double-dipoles or folded-dipoles) antennas, slot (or double-slots or folded slots) antennas, microstrip-type antennas, patch antennas, or any other type of a broadside radiating antenna, wherein the broadside feed antennas 18 are adapted to radiate efficiently within the block of dielectric material 16, wherein the particular design would be adapted for the particular operating frequency. For example, in one embodiment, the broadside feed antennas 18 comprise single or paired rectangular or square conductive patches. In another embodiment, slot feeds might be used.

In accordance with one process, the multi-element broadside feed array 12 and the discrete lens array 14 are each first fabricated separately, and then both are respectively bonded to respective first 40 and second 52 surfaces on opposing sides of the block of dielectric material 16, so as to create an integral multi-beam antenna 10 assembly that provides for maintaining the alignment of the multi-element broadside feed array 12 with respect to the discrete lens array 14, thereby precluding the need for subsequent alignment thereof. Conventional printed circuit board (PCB) construction and assembly processes can be used for the construction and alignment of the multi-element broadside feed array 12 and the discrete lens array 14, and the assembly of the multi-beam antenna 10, which provides for improved reliability and reduced cost thereof.

The multi-beam antenna 10 may further comprise a switching network having at least one input and a plurality of outputs, wherein the at least one input is operatively connected—for example, via at least one transmission line—to a corporate antenna feed port, and each output of the plurality of outputs is connected—for example, via at least one transmission line—to a respective feed port of a different broadside feed antenna 18 of the plurality of broadside feed antennas 18. The switching network further comprises at least one control port for controlling which outputs are connected to the at least one input at a given time. The switching network may, for example, comprise either a plurality of micro-mechanical switches, PIN diode switches, transistor switches, or a combination thereof, and may, for example, be operatively connected to the dielectric substrate, for example, by surface mount to an associated conductive layer of a printed circuit board.

In operation, a feed signal applied to the corporate antenna feed port is either blocked—for example, by an open circuit, by reflection or by absorption,—or switched to the associated feed port of one or more broadside feed antennas 18, via one or more associated transmission lines, by the switching network, responsive to a control signal applied to the control port. It should be understood that the feed signal may either comprise a single signal common to each broadside feed antenna 18, or a plurality of signals associated with different broadside feed antennas 18. Each broadside feed antenna 18 to which the feed signal is applied launches an associated electromagnetic wave into the first side 26.1 of the associated discrete lens array 14, which is diffracted thereby to form an associated beam of electromagnetic energy 20. The associated beams of electromagnetic energy 20 launched by different broadside feed antennas 18 propagate in different associated directions. The various beams of electromagnetic energy 20 may be generated individually at different times so as to provide for a scanned beam of electromagnetic energy 20. Alternately, two or more beams of electromagnetic energy 20 may be generated simultaneously. Moreover, different broadside feed antennas 18 may be driven by different frequencies that, for example, are either directly switched to the respective broadside feed antennas 18, or switched via an associated switching network having a plurality of inputs, at least some of which are connected to different feed signals.

The multi-beam antenna 10 may be adapted so that the respective signals are associated with the respective broadside feed antennas 18 in a one-to-one relationship, thereby precluding the need for an associated switching network. For example, each broadside feed antenna 18 can be operatively connected to an associated signal through an associated processing element. As one example, with the multi-beam antenna 10 configured as an imaging array, the respective broadside feed antennas 18 are used to receive electromagnetic energy, and the respective processing elements comprise detectors. As another example, with the multi-beam antenna 10 configured as a communication antenna, the respective broadside feed antennas 18 are used to both transmit and receive electromagnetic energy, and the respective processing elements comprise transmit/receive modules or transceivers. The switching network, if used, need not be collocated on a common dielectric substrate, but can be separately located, as, for example, may be useful for low frequency applications, for example, for operating frequencies less than 20 GHz, e.g. 1-20 GHz.

Figure 7A:
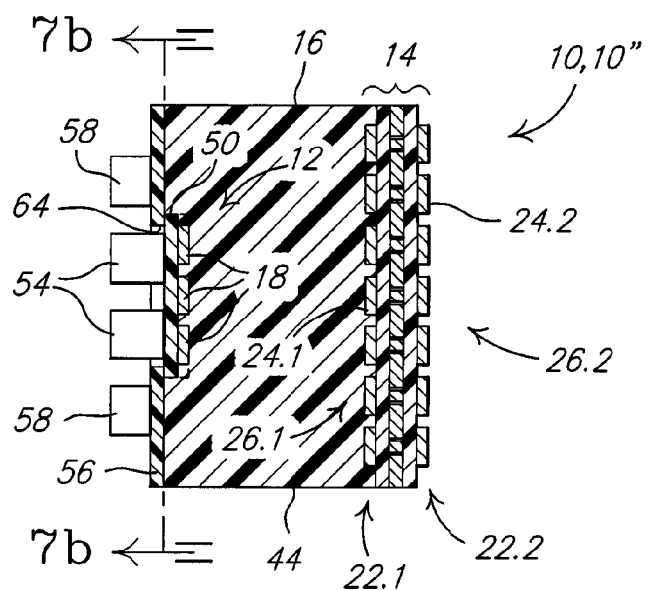
FIG. 7a illustrates a side cross-sectional view of a second embodiment of a multi-beam antenna.

Referring to FIGS. 7a-7c, in accordance with a second embodiment of a multi-beam antenna 10", the multi-element broadside feed array 12 and associated front-end electronic components 54 are constructed on the third dielectric substrate 50, which then cooperates with a separate fourth dielectric substrate 56 containing associated baseband electronic components 58. More particularly, the broadside feed antennas 18, e.g. patch antennas, are located on a first side 60 of the third dielectric substrate 50 comprising a relatively low dielectric constant material, e.g. DUROID®, and the associated front-end electronic components 54, e.g. an associated beam switching network and transceiver, are installed on the opposing second side 62 of the third dielectric substrate 50 and adapted to communicate with the associated broadside feed antennas 18 via either conductive feedlines (e.g. via's) or other electromagnetic coupling (e.g. radiative coupling as illustrated in FIGS. 3 and 4 for the discrete lens array 14) through the third dielectric substrate 50. The fourth dielectric substrate 56 incorporates a cutout 64 adapted to provide clearance for the front-end electronic components 54 on the second side 62 of the third dielectric substrate 50, so as to provide for assembling the third 50 and fourth 56 dielectric substrates to one another and providing for the electrical coupling of signals therebetween. For example, the fourth dielectric substrate 56 could be constructed from a glass-epoxy circuit board, e.g. FR4, adapted to incorporate the associated baseband electronic components 58, e.g. power supplies, control logic, or processing circuitry.

Referring to FIG. 7b, the multi-element broadside feed array 12 comprises a cross-shaped array of seven broadside feed antennas 18.1 adapted to provide or receive an associated seven different beams of electromagnetic energy 20, each at a different azimuthal angle, and all at a common central elevational angle; and three broadside feed antennas 18.1, 18.2, 18.3 adapted to provide or receive an associated three different beams of electromagnetic energy 20, each at a different elevational angle, and all at a common central azimuthal angle, responsive to associated beam control by an associated switching network of the front-end electronic components 54, for example, as described more fully hereinbelow.

Referring to FIG. 8, the multi-element broadside feed array 12 of a second aspect of a multi-beam antenna 200 is adapted so that different broadside feed antennas 18 are oriented in different directions in accordance with the focal surface of the associated discrete lens array 14 so as to provide for increasing the range of scan angles of the multi-beam antenna 200, particularly for broadside feed antennas 18 that are relatively distant from the central axis of the discrete lens array 14 that would otherwise be located substantially displaced from the associated focal surface of the associated discrete lens array 14. Furthermore, referring to FIG. 9, the associated third dielectric substrate 50 is adapted so that all of the associated front-end electronic components 54, e.g. the associated beam selection switches 66 and transceiver 68, are located on a common first side 60 of the third dielectric substrate 50, with a common ground plane on the opposing second side 62. A first portion 70 of the third dielectric substrate 50 containing the broadside feed antennas 18 is separated from a second portion 72 of the third dielectric substrate 50 by the necked portion 74 thereof which, for example, is provided for by a plurality of notches 76 or slits, wherein the necked portion 74 is adapted to be sufficiently wide so as to provide sufficient space for the necessary transmission lines 78, e.g. microstrip lines, along the necked portion 74, connecting the beam selection switches 66 on the second portion 72 of the third dielectric substrate 50 to the broadside feed antennas 18 on the first portion 70 of the third dielectric substrate 50. For example, each transmission line 78 may comprise either a stripline, a microstrip line, an inverted microstrip line, a slotline, an image line, an insulated image line, a tapped image line, a coplanar stripline, or a coplanar waveguide line formed in or on the third dielectric substrate 50, for example, from a printed circuit board, for example, by subtractive technology, for example, chemical or ion etching, or stamping; or additive techniques, for example, deposition, bonding or lamination.

The necked portion 74 enables the first 70 and second 72 portions of the third dielectric substrate 50 to flex relative to one another, so that the second portion 72 of the third dielectric substrate 50 can remain relative flat so as to provide for an operatively coupling thereof to the associated fourth dielectric substrate 56, e.g. FR4 circuit board, as described hereinabove in accordance with the second embodiment of the multi-beam antenna 10'' illustrated in FIGS. 7a and 7b; whereas the first portion 70 of the third dielectric substrate 50 can be curved, for example, by mounting to an appropriately curved support 80, e.g. constructed of either metal or some other material. The ground plane on the second side 62 of the second portion 72 of the third dielectric substrate 50 can be bonded to a corresponding ground plane of the fourth dielectric substrate 56, for example, with conductive epoxy or solder. In the embodiment illustrated in FIG. 8, the multi-element broadside feed array 12 is radiatively coupled to the discrete lens array 14 through an air gap 82, for example, in accordance the U.S. application Ser. No. 11/161,681, which is incorporated herein by reference.

Figure 10:
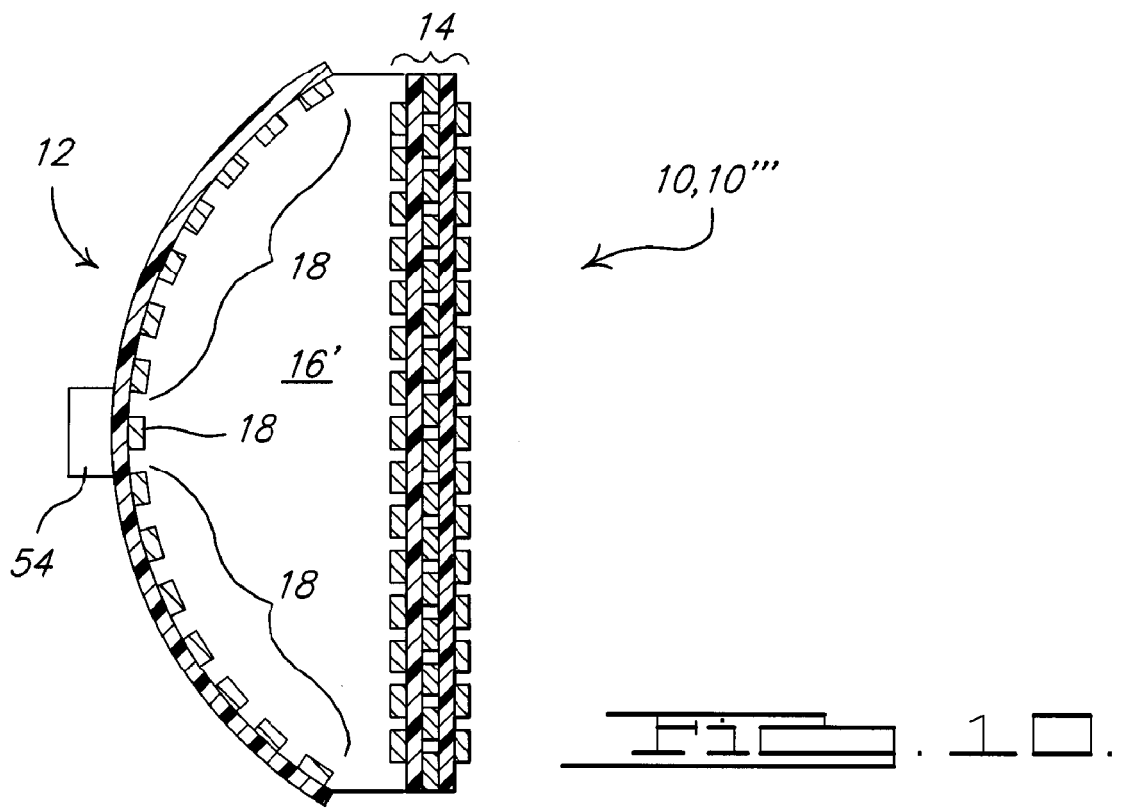
FIG. 10 illustrates a cross-sectional view of a third embodiment of a multi-beam antenna.

Alternatively, referring to FIG. 10, in accordance with a third embodiment of a multi-beam antenna 10''', the third dielectric substrate 50 and associated multi-element broadside feed array 12 may be attached to a curved second surface 52 of a plano-convex block of dielectric material 16' having a discrete lens array 14 operatively coupled to the opposing first surface 40, so as to provide for maintaining the alignment of the multi-element broadside feed array 12 with respect to the discrete lens array 14. The phase delay profile of the discrete lens array 14 would be adapted to account for and cooperate with the phase delays associated with the plano-convex block of dielectric material 16'.

Figure 11:
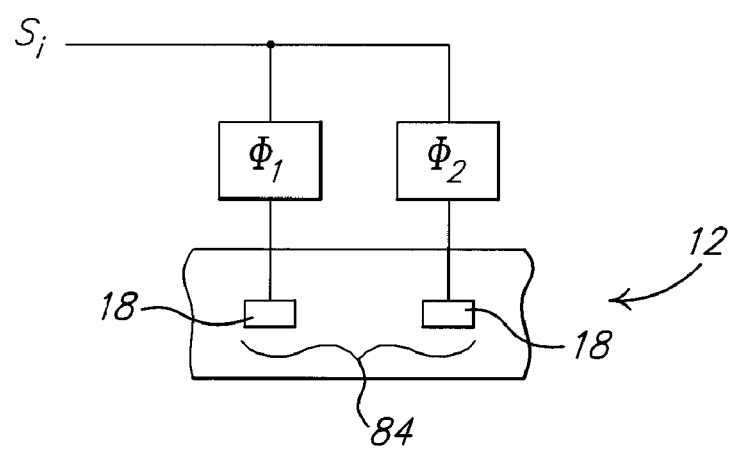
FIG. 11 illustrates a phased-array portion of a multi-element broadside feed array.

Referring to FIG. 11, in any of the embodiments for which the relatively distal broadside feed antennas 18 are sufficiently displaced from the focal surface of the discrete lens array 14 so as to excessively disrupt the associated radiation pattern of the associated beam of electromagnetic energy 20, pluralities, e.g. adjacent pairs 84, of broadside feed antennas 18 can be phased so as to direct the associated beam of electromagnetic energy 20, or the directivity of the associated broadside feed antennas 18, towards the center of the discrete lens array 14.

One first embodiment of the multi-beam antenna 10' provides for +/−fifty (50) degree scanning in an elevation, azimuth, or a diagonal direction, although a scan range of at least +/−sixty (60) degrees is likely achievable. The multi-beam antenna 10, 200 is suitable for automotive collision avoidance systems, automatic cruise control, and other automotive applications, for example, at 24 GHz, 60 GHz and 77 GHz. The multi-beam antenna 10, 200 may be adapted with a radome, e.g. a thick low loss plastic coating, so as to provide for environmental protection thereof.

Figure 12:
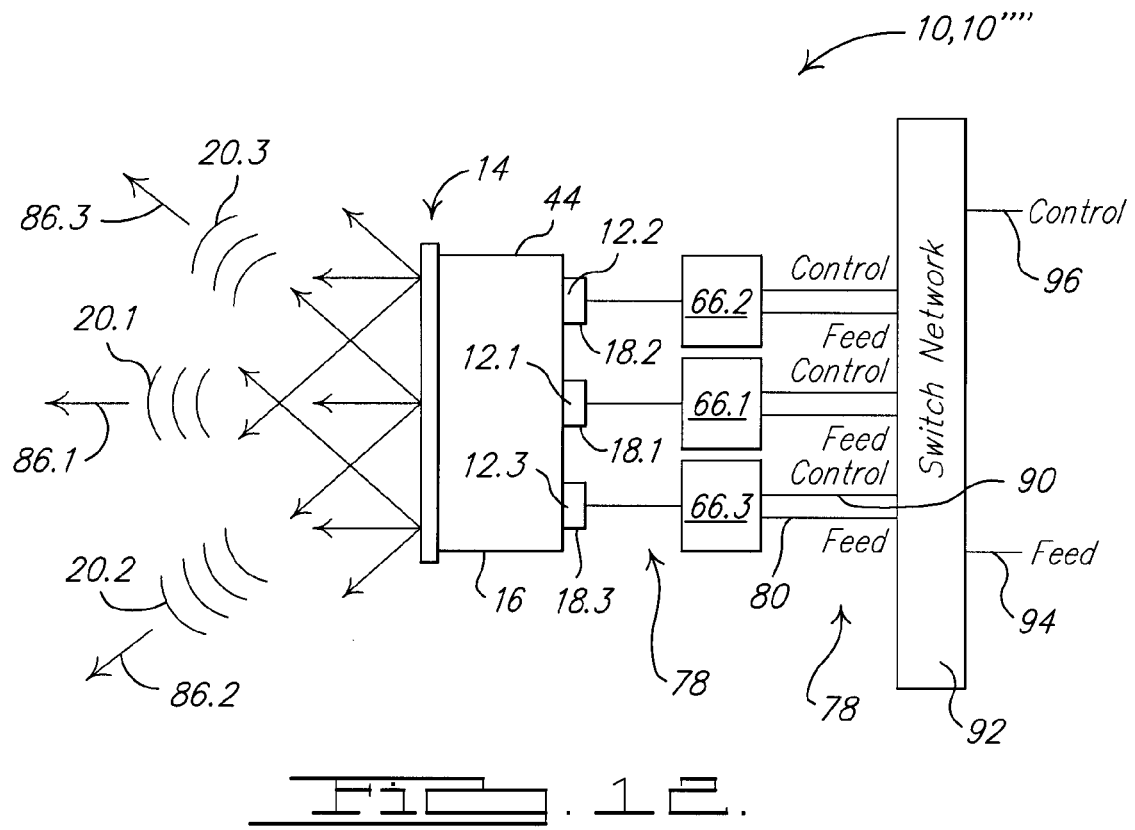
FIG. 12 illustrates an elevational side view of a fourth embodiment of a multi-beam antenna.

Referring FIG. 12, in accordance with a fourth embodiment of a multi-beam antenna 10'''', a plurality of linear multi-element broadside feed arrays 12.1, 12.2, 12.3—each providing for generating one or more corresponding beams of electromagnetic energy 20 in a corresponding one or more associated azimuthal directions—are adapted to cooperate with a discrete lens array 14 through a block of dielectric material 16, so as to provide for generating corresponding sets 20.1, 20.2, 20.3 of beams of electromagnetic energy 20, each in corresponding one or more associated elevational directions. For example, a first multi-element broadside feed array 12.1 comprises a corresponding one or more associated first broadside feed antennas 18.1, each providing for generating a corresponding beam of electromagnetic energy 20 in a different azimuthal direction, all in a first elevational direction 86.1, which, for example, in the origination illustrated in FIG. 12 is directed substantially horizontal. A second multi-element broadside feed array 12.2 comprises a corresponding one or more associated second broadside feed antennas 18.2, each providing for generating a corresponding beam of electromagnetic energy 20 in a different azimuthal direction, all in a second elevational direction 86.2, which, for example, in the origination illustrated in FIG. 12 is directed downwards from horizontal. A third multi-element broadside feed array 12.3 comprises a corresponding one or more associated third broadside feed antennas 18.3, each providing for generating a corresponding beam of electromagnetic energy 20 in a different azimuthal direction, all in a third elevational direction 86.3, which, for example, in the origination illustrated in FIG. 12 is directed upwards from horizontal. Each of the multi-element broadside feed arrays 12.1, 12.2, 12.3 is operatively coupled to a corresponding associated set of beam selection switches 66.1, 66.2, 66.3, each of which is operatively coupled via associated feed 88 and control 90 lines to an associated switch network 92 having associated feed 94 and control 96 signals. Responsive to a control input signal 96, the switch network 92 selects the beam selection switches 66.1, 66.2, 66.3 to which the control signal 96 is applied, thereby controlling which of the multi-element broadside feed arrays 12.1, 12.2, 12.3 is operatively associated with the feed 94 and control 96 signals, thereby controlling which of the sets 20.1, 20.2, 20.3 of beams of electromagnetic energy 20 are either generated or received in a corresponding elevational direction or set of elevational directions, and the control signals 96 applied to the beam selection switches 66.1, 66.2, 66.3 control which of the associated broadside feed antennas 18.1, 18.2, 18.3 are activated to either generate or receive a corresponding beam of electromagnetic energy 20 in a corresponding selected azimuthal direction. The beam selection switches 66.1, 66.2, 66.3 and the switch network 92 may be integrated with the associated multi-element broadside feed arrays 12.1, 12.2, 12.3, for example, in the front-end electronic components 54 as illustrated in FIG. 7a, wherein the beam selection switches 66.1, 66.2, 66.3 and the switch network 92 are interconnected and operatively coupled to the associated broadside feed antennas 18.1, 18.2, 18.3 with associated transmission lines 78. In an alternative embodiment, the switch network 92 may be connected to the broadside feed antennas 18.1, 18.2, 18.3 directly, without using the intermediate beam selection switches 66.1, 66.2, 66.3 and associated control lines 90. Accordingly, the fourth embodiment of the multi-beam antenna 10"" provides for transmitting or receiving one or more beams of electromagnetic energy 20 over a three-dimensional space.

Figure 13:
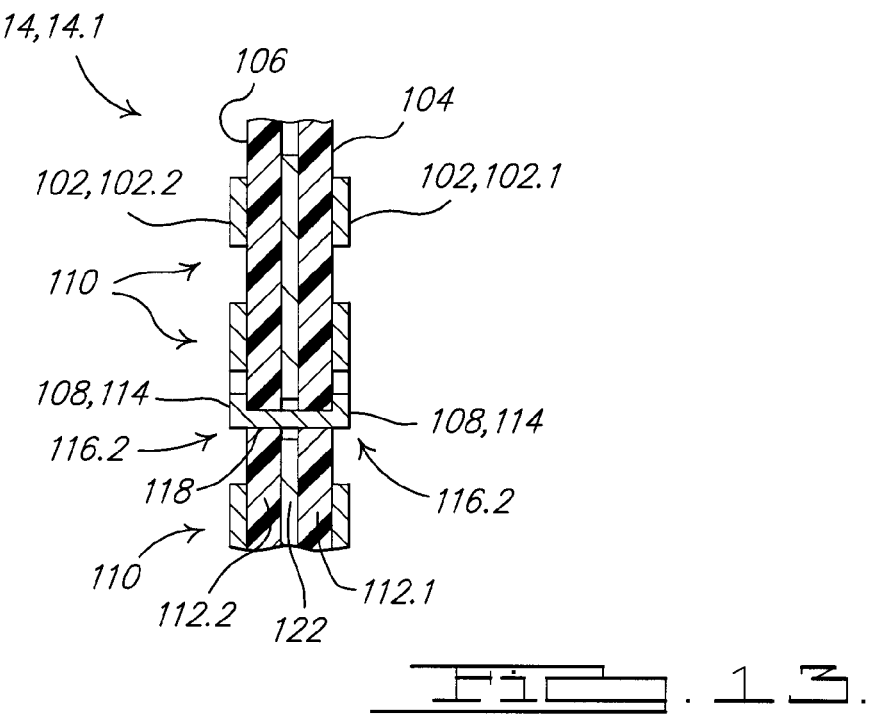
FIG. 13 illustrates a fragmentary side cross-sectional view of a second aspect of a discrete lens array.
Figure 14:
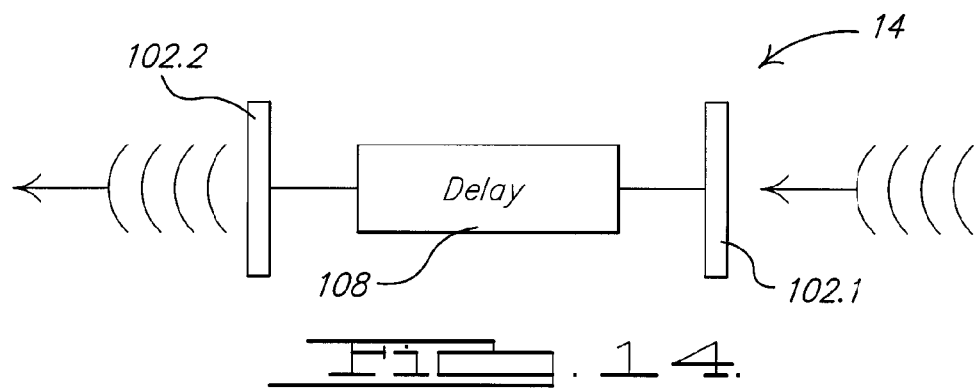
FIG. 14 illustrates a block diagram of a discrete lens array.

Referring to FIG. 13, in accordance with a second aspect of a discrete lens array 14, the first 24.1 and second 24.2 broadside antenna elements of each pair 28 communicate through associated transmission line delay elements 30, the length of which is adapted so as to provide for the associated delay. For example, a planar lens 14.1 comprises a first set of patch antennas 102.1 on a first side 104 of the planar lens 14.1, and a second set of patch antennas 102.2 on the second side 106 of the planar lens 14.1, where the first 104 and second 106 sides are opposite one another. The individual patch antennas 102 of the first 102.1 and second 102.2 sets of patch antennas are in one-to-one correspondence. Referring to FIG. 14, each patch antenna 102, 102.1 on the first side 104 of the planar lens 14.1 is operatively coupled via a delay element 108 to a corresponding patch antenna 102, 102.2 on the second side 106 of the planar lens 14.1, wherein the patch antenna 102, 102.1 on the first side 104 of the planar lens 14.1 is substantially aligned with the corresponding patch antenna 102, 102.2 on the second side 106 of the planar lens 14.1.

In operation, electromagnetic energy that is radiated upon one of the patch antennas 102, e.g. a first patch antenna 102.1 on the first side 104 of the planar lens 14.1, is received thereby, and a signal responsive thereto is coupled via—and delayed by—the delay element 108 to the corresponding patch antenna 102, e.g. the second patch antenna 102.2, wherein the amount of delay by the delay element 108 is dependent upon the location of the corresponding patch antennas 102 on the respective first 104 and second 106 sides of the planar lens 14.1. The signal coupled to the second patch antenna 102.2 is then radiated thereby from the second side 106 of the planar lens 14.1. Stated in another way, the planar lens 14.1 comprises a plurality of lens elements 110, wherein each lens element 110 comprises a first patch antenna element 102.1 operatively coupled to a corresponding second patch antenna element 102.2 via at least one delay element 108, wherein the first 102.1 and second 102.2 patch antenna elements are substantially opposed to one another on opposite sides of the planar lens 14.1.

Figure 15A:
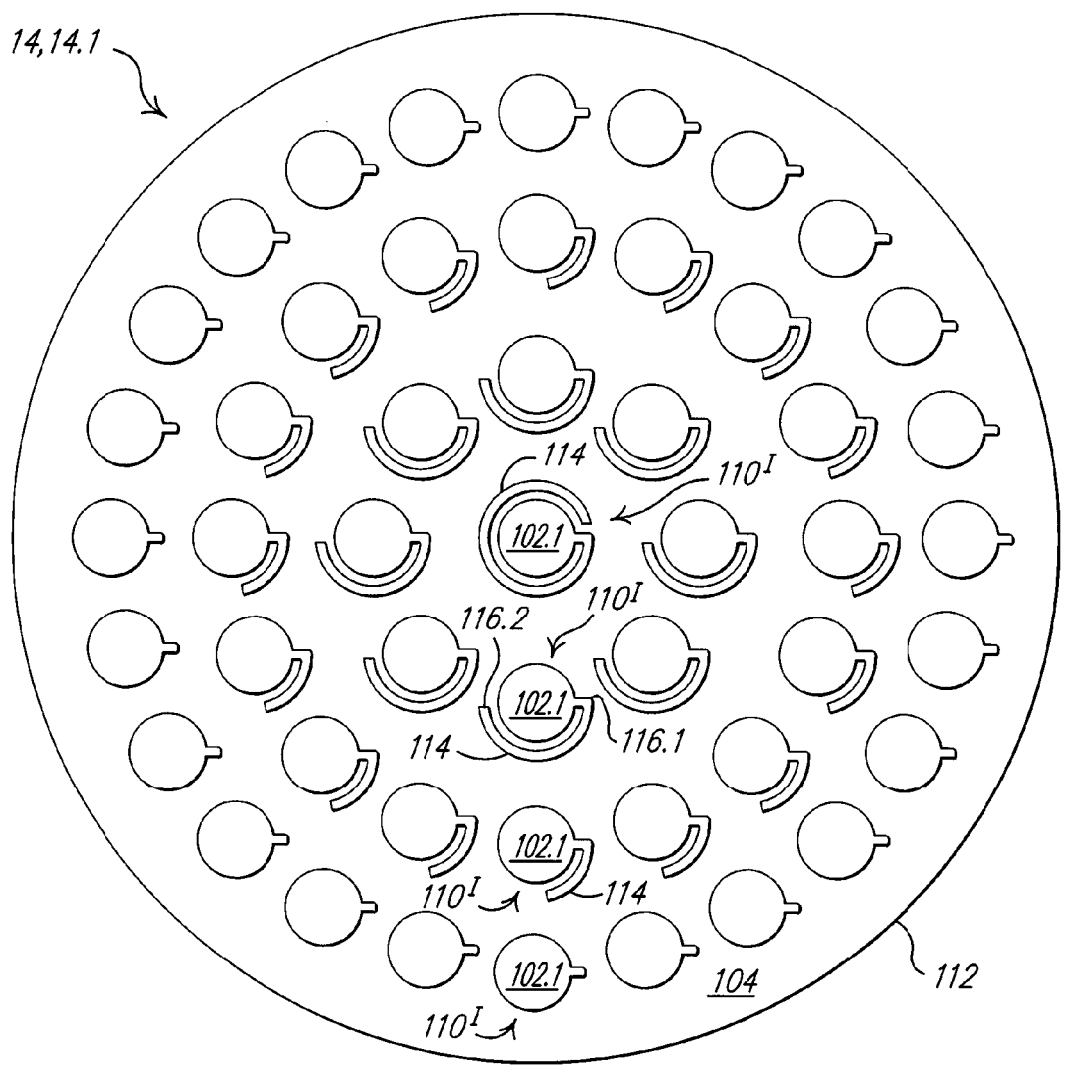
FIG. 15a illustrates a plan view of a first side of one embodiment of a planar discrete lens array.
Figure 15B:
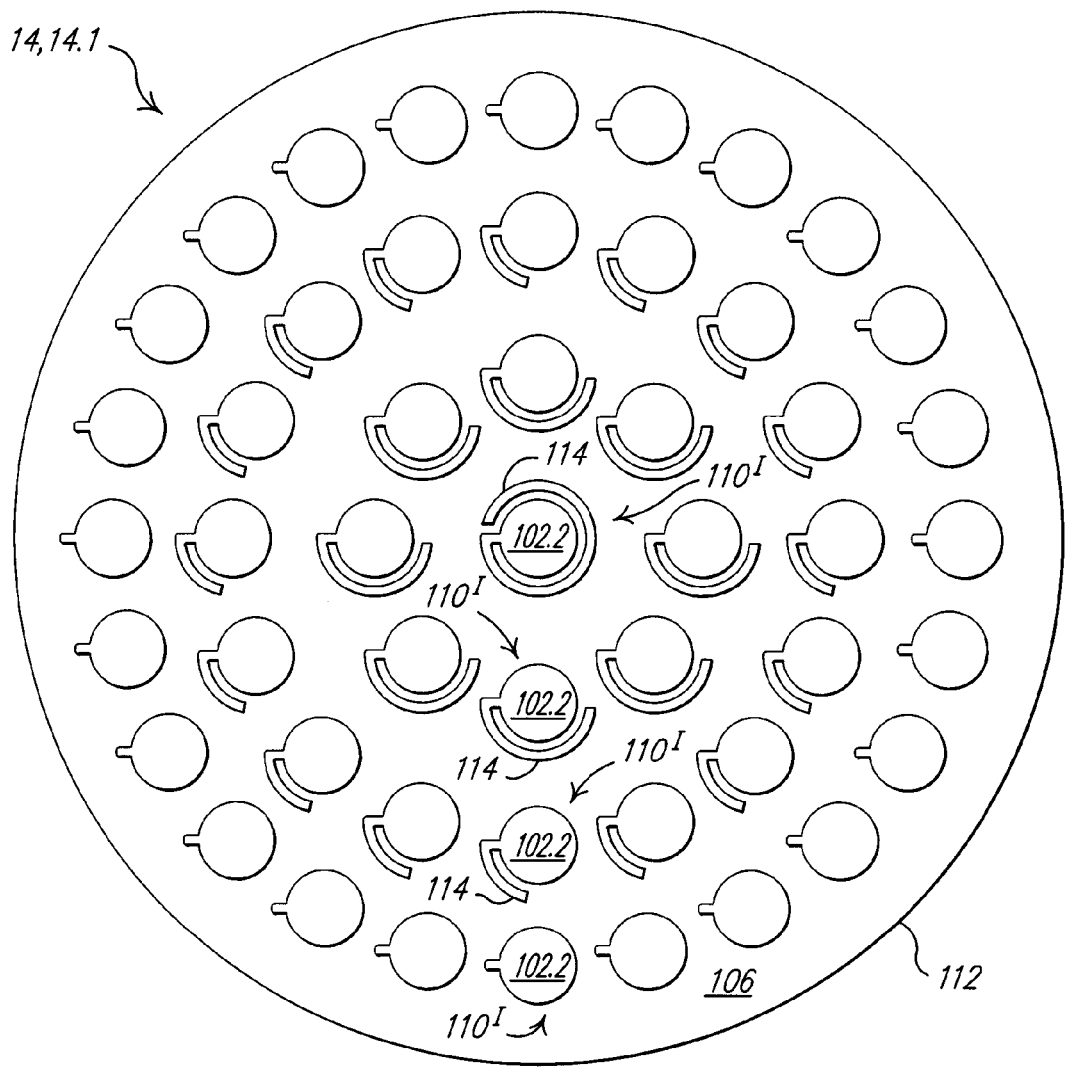
FIG. 15b illustrates a plan view of a second side of one embodiment of a planar discrete lens array.
Figure 15:
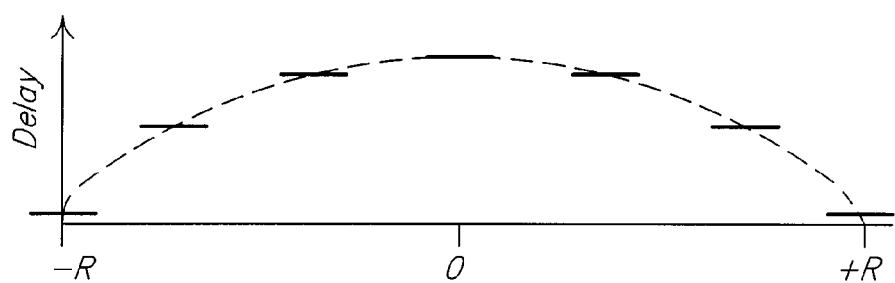

Referring also to FIGS. 15*a* and 15*b*, in a first embodiment of a planar lens 14.1, the patch antennas 102.1, 102.2 comprise conductive surfaces on a dielectric substrate 112, and the delay element 108 coupling the patch antennas 102.1, 102.2 of the first 104 and second 106 sides of the planar lens 14.1 comprise delay lines 114, e.g. microstrip or stipline structures, that are located adjacent to the associated patch antennas 102.1, 102.2 on the underlying dielectric substrate 112. The first ends 116.1 of the delay lines 114 are connected to the corresponding patch antennas 102.1, 102.2, and the second ends 116.2 of the delay lines 114 are interconnected to one another with a conductive path, for example, with a conductive via 118 though the dielectric substrate 112. FIGS. 15*a* and 15*b* illustrate the delay lines 114 arranged so as to provide for feeding the associated first 102.1 and second 102.2 sets of patch antennas at the same relative locations.

Referring to FIG. 16, the amount of delay caused by the associated delay elements 108 is made dependent upon the location of the associated patch antenna 102 in the planar lens 14.1, and, for example, is set by the length of the associated delay lines 114, as illustrated by the configuration illustrated in FIGS. 15*a* and 15*b*, so as to emulate the phase properties of a convex electromagnetic lens, e.g. a spherical lens. The shape of the delay profile illustrated in FIG. 16 can be of various configurations, for example, 1) uniform for all radial directions, thereby emulating a spherical lens; 2) adapted to incorporate an azimuthal dependence, e.g. so as to emulate an elliptical lens; or 3) adapted to provide for focusing in one direction only, e.g. in the elevation plane of the multi-beam antenna, e.g. so as to emulate a cylindrical lens.

Figure 17:
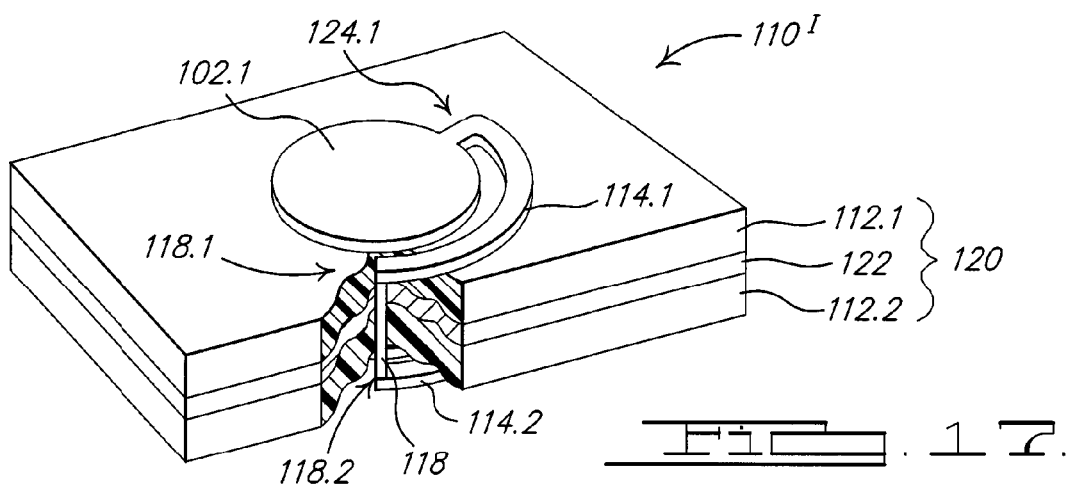
FIG. 17 illustrates a fragmentary cross sectional isometric view of a first embodiment of a discrete lens antenna element.
Figure 18:
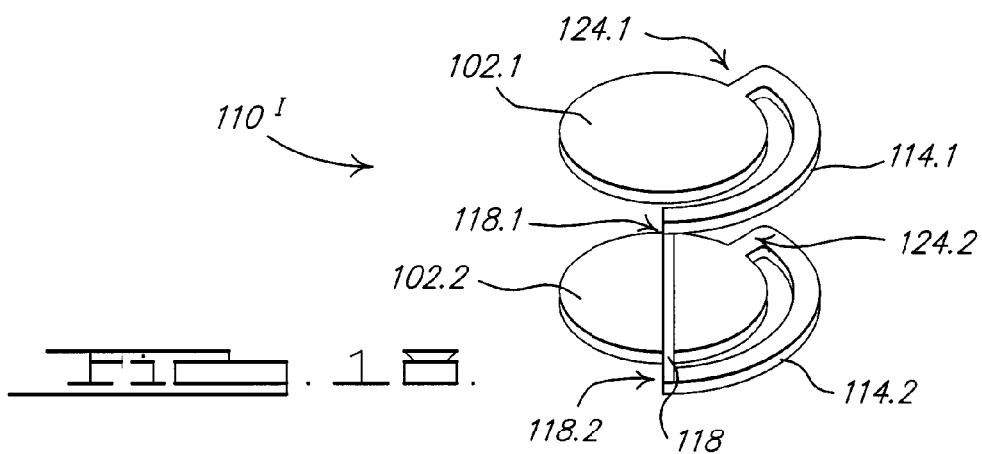
FIG. 18 illustrates an isometric view of the first embodiment of a discrete lens antenna element illustrated in FIG. 17, isolated from associated dielectric substrates.

Referring to FIGS. 17 and 18, a first embodiment of a lens element 110$^I$ of the planar lens 14.1 illustrated in FIGS. 15*a* and 15*b* comprises first 102.1 and second 102.2 patch antenna elements on the outer surfaces of a core assembly 120 comprising first 112.1 and second 112.2 dielectric substrates on both sides of a conductive ground plane 122 sandwiched therebetween. A first delay line 114.1 on the first side 104 of the planar lens 14.1 extends circumferentially from a first location 124.1 on the periphery of the first patch antenna element 102.1 to a first end 118.1 of a conductive via 118 extending through the core assembly 120, and a second delay line 114.2 on the second side 106 of the planar lens 14.1 extends circumferentially from a second location 124.2 on the periphery of the second patch antenna element 102.2 to a second end 118.2 of the conductive via 118. Accordingly, the combination of the first 114.1 and second 114.2 delay lines interconnected by the conductive via 118 constitutes the associated delay element 108 of the lens element 110, and the amount of delay of the delay element 108 is generally responsive to the cumulative circumferential lengths of the associated first 114.1 and second 114.2 delay lines and the conductive via 118. For example, the delay element 108 may comprise at least one transmission line comprising either a stripline, a microstrip line, an inverted microstrip line, a slotline, an image line, an insulated image line, a tapped image line, a coplanar stripline, or a coplanar waveguide line formed on the dielectric substrate(s) 112, 112.1, 112.2, for example, from a printed circuit board, for example, by subtractive technology, for example, chemical or ion etching, or stamping; or additive techniques, for example, deposition, bonding or lamination.

Figure 19:
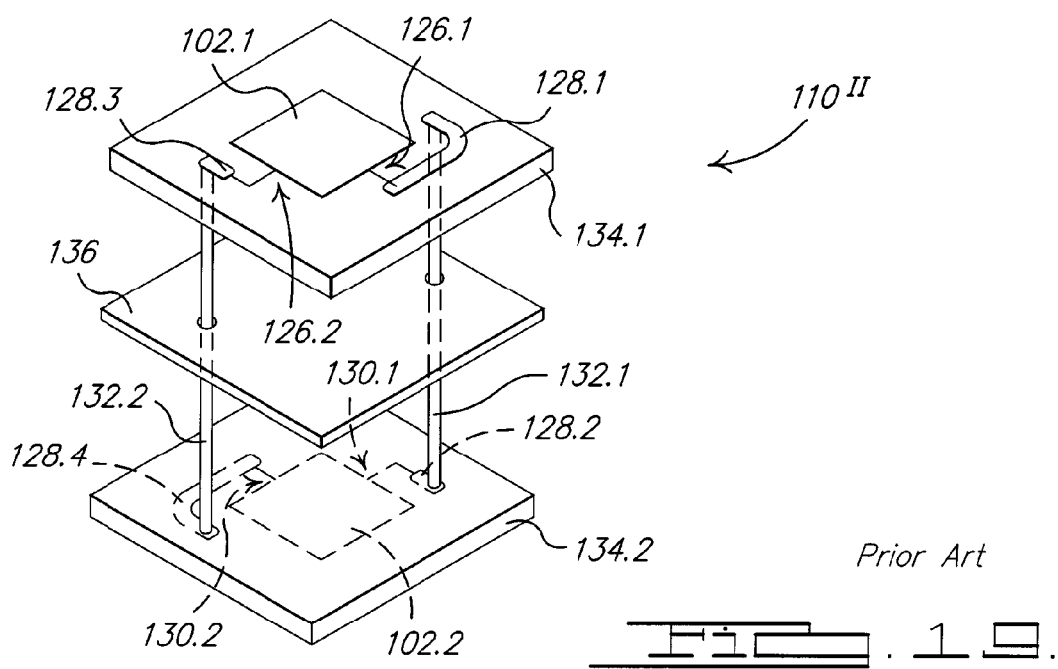
FIG. 19 illustrates an isometric view of a second embodiment of a discrete lens antenna element.

Referring to FIG. 19, in accordance with a second embodiment of a lens element 110$^{II}$ of the planar lens 14.1, the first 102.1 and second 102.2 patch antenna elements may be interconnected with one another so as to provide for dual polarization, for example, as disclosed in the technical paper "Multibeam Antennas with Polarization and Angle Diversity" by Darko Popovic and Zoya Popovic in *IEEE Transactions on Antenna and Propagation*, Vol. 50, No. 5, May 2002, which is incorporated herein by reference. A first location 126.1 on an edge of the first patch antenna element 102.1 is connected via first 128.1 and second 128.2 delay lines to a first location 130.1 on the second patch antenna element 102.2, and a second location 126.2 on an edge of the first patch antenna element 102.1 is connected via third 128.3 and fourth 128.4 delay lines to a second location 130.2 on the second patch antenna element 102.2, wherein, for example, the first 126.1 and second 126.2 locations on the first patch antenna element 102.1 are substantially orthogonal with respect to one another, as are the corresponding first 130.1 and second 130.2 locations on the second patch antenna element 102.2. The first 128.1 and second 128.2 delay lines are interconnected with a first conductive via 132.1 that extends through associated first 134.1 and second 134.2 dielectric substrates and through a conductive ground plane 136 located therebetween. Similarly, the third 128.3 and fourth 128.4 delay lines are interconnected with a second conductive via 132.2 that also extends through the associated first 134.1 and second 134.2 dielectric substrates and through the conductive ground plane 136. In the embodiment illustrated in FIG. 19, the first location 126.1 on the first patch antenna element 102.1 is shown substantially orthogonal to the first location 130.1 on the second patch antenna element 102.2 so that the polarization of the radiation from the second patch antenna element 102.2 is orthogonal with respect to that of the radiation incident upon the first patch antenna element 102.1. However, it should be understood that the first locations 126.1 and 130.1 could be aligned with one another, or could be oriented at some other angle with respect to one another.

Figure 20:
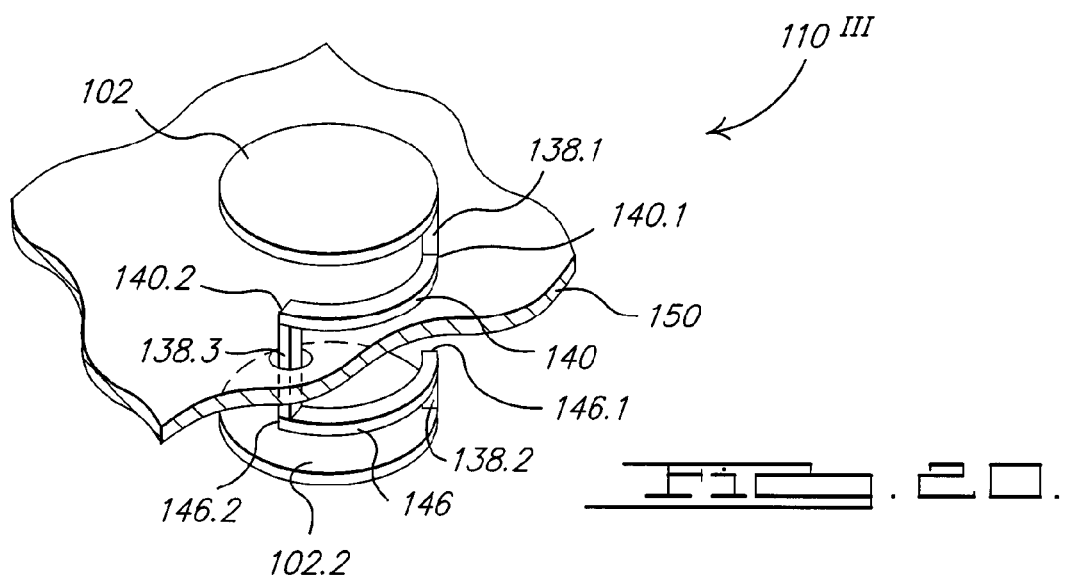
FIG. 20 illustrates an isometric view of a third embodiment of a discrete lens antenna element, isolated from associated dielectric substrates.
Figure 21:
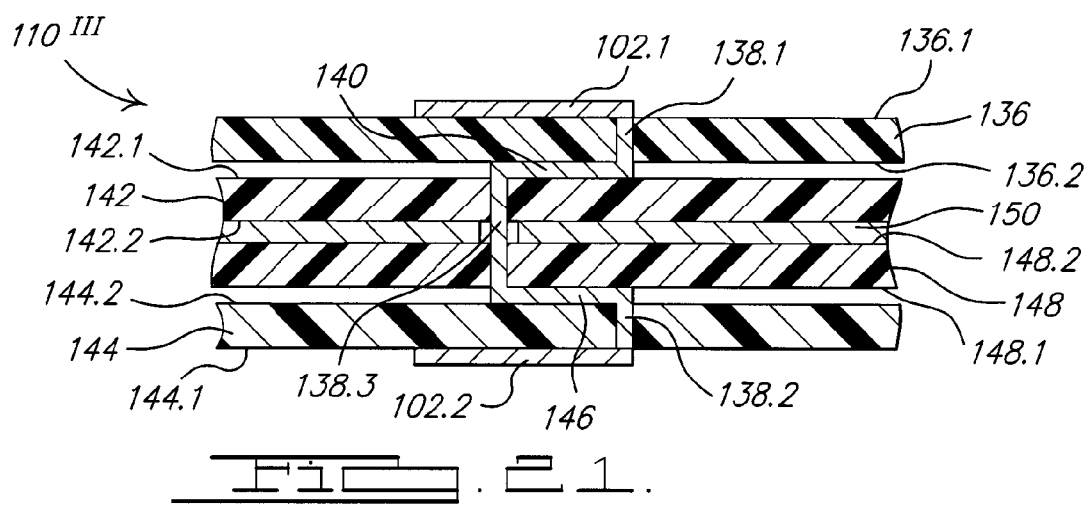
FIG. 21 illustrates a cross sectional view of the third embodiment of the discrete lens antenna element.

Referring to FIGS. 20 and 21, in accordance with a third embodiment of a lens element $110^{III}$ of the planar lens 14.1, one or more delay lines 114 may be located between the first 102.1 and second 102.2 patch antenna elements—rather than adjacent thereto as in the first and second embodiments of the lens element $110^{I}$, $110^{II}$—so that the delay lines 114 are shadowed by the associated first 102.1 and second 102.2 patch antenna elements. For example, in one embodiment, the first patch antenna element 102.1 on a first side 136.1 of a first dielectric substrate 136 is connected with a first conductive via 138.1 through the first dielectric substrate 136 to a first end 140.1 of a first delay line 140 located between the second side 136.2 of the first dielectric substrate 136 and a first side 142.1 of a second dielectric substrate 142. Similarly, the second patch antenna element 102.2 on a first side 144.1 of a third dielectric substrate 144 is connected with a second conductive via 138.2 through the third dielectric substrate 144 to a first end 146.1 of a second delay line 146 located between the second side 144.2 of the third dielectric substrate 144 and a first side 148.1 of a fourth dielectric substrate 148. A third conductive via 138.3 interconnects the second ends 140.2, 146.2 of the first 140 and second 146 delay lines, and extends through the second 142 and fourth 148 dielectric substrates, and through a conductive ground plane 150 located between the second sides 142.2, 148.2 of the second 142 and fourth 148 dielectric substrates. The first 140 and second 146 delay lines are shadowed by the first 102.1 and second 102.2 patch antenna elements, and therefore do not substantially affect the respective radiation patterns of the first 102.1 and second 102.2 patch antenna elements.

Figure 22:
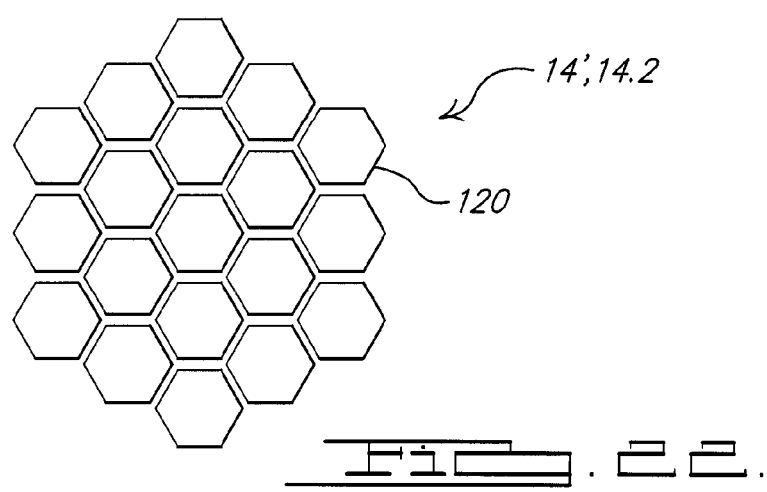
FIG. 22 illustrates a plan view of a second embodiment of a discrete lens array.

Referring to FIG. 22, in accordance with a second embodiment of a planar lens 14.2, the patch antennas 102 are hexagonally shaped so as to provide for a more densely packed discrete lens array 14'. The particular shape of the individual patch antennas 102 is not limiting, and for example, can be circular, rectangular, square, triangular, pentagonal, hexagonal, or some other polygonal shape or an arbitrary shape.

Notwithstanding that FIGS. 13, 15a, 15b, and 17-21 illustrate a plurality of delay lines 114.1, 114.2, 128.1, 128.2, 128.3, 128.4, 140, 146 interconnecting the first 102.1 and second 102.2 patch antenna elements, it should be understood that a single delay line 114—e.g. located on a surface of one of the dielectric substrates 112, 134, 136, 142, 144—could be used, interconnected to the first 102.1 and second 102.2 patch antenna elements with associated conductive paths.

Figure 23:
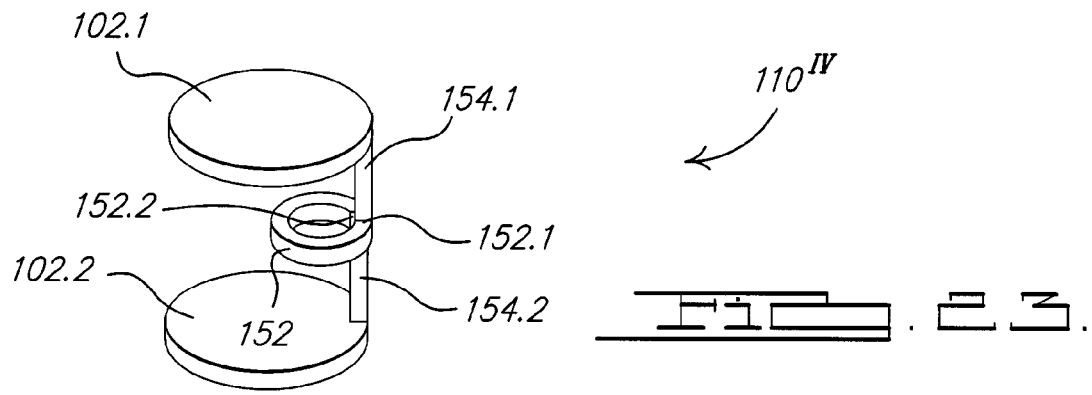
FIG. 23 illustrates an isometric view of a fourth embodiment of a discrete lens antenna element, isolated from associated dielectric substrates.
Figure 24A:
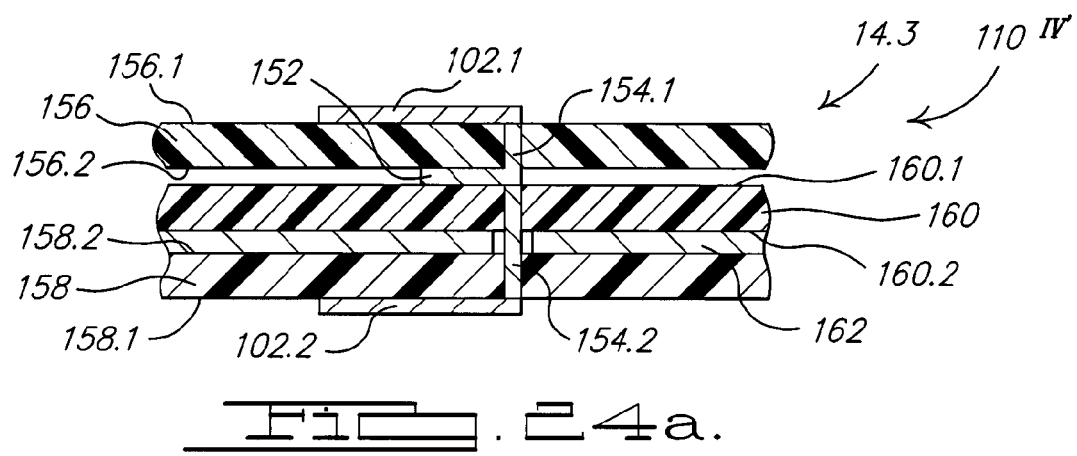
FIG. 24a illustrates a cross sectional view of the fourth embodiment of the discrete lens antenna element of a third embodiment of a discrete lens array.
Figure 24B:
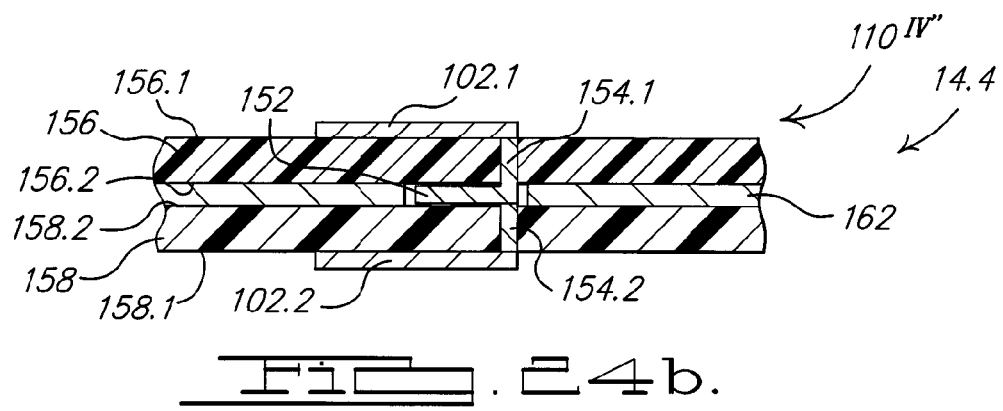
FIG. 24b illustrates a cross sectional view of the fourth embodiment of a discrete lens antenna element of a fourth embodiment of a discrete lens array.

Referring to FIGS. 23, 24a and 24b, in accordance with a fourth embodiment of a lens element $110^{IV}$ of the planar lens 14.1, the first 102.1 and second 102.2 patch antenna elements are interconnected with a delay line 152 located therebetween, wherein a first end 152.1 of the delay line 152 is connected with a first conductive via 154.1 to the first patch antenna element 102.1 and a second end 152.2 of the delay line 152 is connected with a second conductive via 154.2 to the second patch antenna element 102.2. Referring to FIG. 24a, in accordance with a third embodiment of a planar lens 14.3 incorporating the fourth embodiment of the lens element $110^{IV}$, the first patch antenna element 102.1 is located on a first side 156.1 of a first dielectric substrate 156, and the second patch antenna element 102.2 is located on a first side 158.1 of a second dielectric substrate 158. The delay line 152 is located between the second side 156.2 of the first dielectric substrate 156 and a first side 160.1 of a third dielectric substrate 160 and the first conductive via 154.1 extends through the first dielectric substrate 156. A conductive ground plane 162 is located between the second sides 158.2, 160.2 of the second 158 and third 160 dielectric substrates, respectively, and the second conductive via 154.2 extends through the second 158 and third 160 dielectric substrates and through the conductive ground plane 162. Referring to FIG. 24b, a fourth embodiment of a planar lens 14.4 incorporates the fourth embodiment of a lens element $110^{IV'}$ illustrated in FIG. 23, without the third dielectric substrate 160 of the third embodiment of the planar lens 14.3 illustrated in FIG. 24a, wherein the delay line 152 and the conductive ground plane 162 are coplanar between the second sides 156.2, 158.2 of the first 156 and second 158 dielectric substrates, and are insulated or separated from one another.

The discrete lens array 14 does not necessarily have to incorporate a conductive ground plane 122, 136, 150, 162. For example, in the fourth embodiment of a planar lens 14.4 illustrated in FIG. 24b, the conductive ground plane 162 is optional, particularly if a closely packed array of patch antennas 102 were used as illustrated in FIG. 22. Furthermore, the first embodiment of a lens element $110^{I}$ illustrated in FIG. 18 could be constructed with the first 102.1 and second 102.2 patch antenna elements on opposing sides of a single dielectric substrate 112.

It should be understood that if the number of broadside feed antennas 18 of the multi-element broadside feed array 12 is reduced to one, the multi-beam antenna 10 will become a single-beam antenna 10 so as to provide for either generating or receiving a single beam of electromagnetic energy 20.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. An antenna, comprising:
   a. a dielectric material comprising first and second surfaces on opposing sides of said dielectric material;
   b. a discrete lens array operatively coupled to said first surface of said dielectric material; and
   c. at least one broadside feed antenna operatively coupled to said second surface of said dielectric material, wherein said at least one broadside feed antenna cooperates with said discrete lens array through said dielectric material between said first and second surfaces thereof so as to provide for either radiating electromagnetic energy through said dielectric material to said discrete lens array or receiving electromagnetic energy from said discrete lens array through said dielectric material.

2. An antenna as recited in claim 1, wherein said discrete lens array comprises a plurality of electromagnetic lens elements, wherein each electromagnetic lens element of said plurality of electromagnetic lens elements comprises:
  a. first and second conductive patch elements;
  b. at least one dielectric layer interposed between said first and second conductive patch elements, wherein said first conductive patch element is located on a first surface of said at least one dielectric layer, and said second conductive patch element is located on a second surface of said at least one dielectric layer; and
  c. at least one delay element operative between said first and second conductive patch elements;
wherein said first and second conductive patch elements are located on respective first and second sides of said discrete lens array, said first side of said discrete lens array is adapted to be in electromagnetic wave communication with said at least one broadside feed antenna, said at least one delay element operative between said first and second conductive patch elements delays a propagation of an electromagnetic wave between said first and second conductive patch elements by a delay period, and said delay period of at least one of said plurality of electromagnetic lens elements is different from a delay period of at least another of said plurality of electromagnetic lens elements.

3. An antenna as recited in claim 1, wherein said first surface of said dielectric material comprises a substantially flat surface.

4. An antenna as recited in claim 1, wherein said second surface of said dielectric material comprises a substantially flat surface.

5. An antenna as recited in claim 1, wherein said first and second surfaces of said dielectric material comprise substantially flat surfaces that are substantially parallel to one another.

6. An antenna as recited in claim 1, wherein said discrete lens array comprises a nominal focal surface, said nominal focal surface is curved, and at least a portion of said second surface of said dielectric material is curved so as to substantially follow said nominal focal surface.

7. An antenna as recited in claim 1, wherein said discrete lens array is bonded to said first surface of said dielectric material.

8. An antenna as recited in claim 1, wherein said at least one broadside feed antenna is bonded to said second surface of said dielectric material.

9. An antenna as recited in claim 1, wherein at least one said at least one broadside feed antenna is either a dipole antenna, a patch antenna, a slot antenna, or a microstrip antenna.

10. An antenna as recited in claim 1, wherein said at least one broadside feed antenna comprises a plurality of broadside feed antennas.

11. An antenna as recited in claim 10, wherein at least a portion of said plurality of broadside feed antennas comprise a one-dimensional array of broadside feed antennas.

12. An antenna as recited in claim 11, wherein at least a portion of said plurality of broadside feed antennas comprise a plurality of one- dimensional arrays of broadside feed antennas, and at least two of said plurality of one-dimensional arrays of broadside feed antennas are oriented in different directions.

13. An antenna as recited in claim 1, further comprising a dielectric substrate, wherein said at least one broadside feed antenna is attached to said dielectric substrate, said dielectric substrate is attached to said second surface of said dielectric material, and said dielectric substrate is adapted to provide for coupling at least one signal to said at least one broadside feed antenna.

14. An antenna as recited in claim 13, further comprising a switching network and a corporate feed, wherein said at least one broadside feed antenna comprises a plurality of broadside feed antennas, said switching network is adapted to control which of said plurality of broadside feed antennas are operatively coupled to said corporate feed, and said switching network in operatively coupled to said dielectric substrate.

15. An antenna as recited in claim 2, wherein said at least one dielectric layer comprises first and second dielectric substrates, said first conductive patch element is located on a first surface of said first dielectric substrate, said second conductive patch element is located on a second surface of said second dielectric substrate, further comprising a conductive layer between said first and second dielectric substrates, wherein said conductive layer incorporates at least one slot located between said first and second conductive patch elements of said electromagnetic lens element, and said at least one slot is adapted to provide for said delay period of said electromagnetic lens element.

16. An antenna as recited in claim 15, wherein said at least one slot comprises a U-shaped slot.

17. An antenna as recited in claim 2, wherein said at least one dielectric layer comprises a single dielectric layer, said first and second surfaces of said at least one dielectric layer are on opposing surfaces of said single dielectric layer, said first surface of said at least one dielectric layer faces said first side of said discrete lens array, and said second surface of said at least one dielectric layer faces said second side of said discrete lens array.

18. An antenna as recited in claim 2, wherein said at least one delay element comprises at least one transmission line that operates in cooperation with said at least one dielectric layer.

19. An antenna as recited in claim 18, wherein a first end of said at least one transmission line is operatively coupled to said first conductive patch element, and a second end of said at least one transmission line is operatively coupled to said second conductive patch element.

20. An antenna as recited in claim 19, wherein said at least one transmission line comprises a conductive interconnection through said at least one dielectric layer.

21. An antenna as recited in claim 20, wherein said at least one transmission line is located on at least one of said first and second surfaces of said at least one dielectric layer.

22. An antenna as recited in claim 21, wherein said at least one transmission line is located along a path that substantially follows a peripheral contour of at least one of said first and second conductive patch elements proximally adjacent to said at least one of said first and second conductive patch elements.

23. An antenna as recited in claim 21, wherein said at least one transmission line comprises first and second transmission lines, a first end of said first transmission line is operatively coupled to said first conductive patch element at a first location, a second end of said first transmission line is operatively coupled to a first end of said conductive interconnection through said at least one dielectric layer, said first transmission line is operatively associated with said first surface of said at least one dielectric layer, a first end of said second transmission line is operatively coupled to said second conductive patch element at a second location, a second end of said second transmission line is operatively coupled to a second end of said conductive interconnection through said at least one dielectric layer, and said second transmission line is operatively associated with said second surface of said at least one dielectric layer.

24. An antenna as recited in claim 23, wherein said first and second locations are substantially aligned in opposition to one another across said at least one dielectric layer.

25. An antenna as recited in claim 2, wherein a first end of said at least one delay element is operatively coupled to said first conductive patch element at a first location, a second end of said at least one delay element is operatively coupled to said second conductive patch element at a second location, and said first and second locations are displaced from one another so as to provide for rotating a polarization of said electromagnetic wave at said second conductive patch element relative to said polarization at said first conductive patch element.

26. An antenna as recited in claim 2, wherein said at least one dielectric layer comprises at least first and second dielectric layers, said first surface of said at least one dielectric layer comprises a first surface of said first dielectric layer, said second surface of said at least one dielectric layer comprises a first surface of said second dielectric layer, further comprising a conductive layer interposed between a second surface of said first dielectric layer and a second surface of said second dielectric layer, wherein said at least one delay element is interconnected with an interconnection through said first and second dielectric layers and through said conductive layer, and said interconnection is insulated from said conductive layer.

27. An antenna as recited in claim 2, wherein said at least one dielectric layer comprises at least first and second dielectric layers, said first surface of said at least one dielectric layer comprises a first surface of said first dielectric layer, said second surface of said at least one dielectric layer comprises a first surface of said second dielectric layer, said at least one delay element comprises at least one transmission line interposed between a second surface of said first dielectric layer and a second surface of said second dielectric layer, a first end of said at least one delay element is operatively coupled to said first conductive patch element with a first conductive interconnection through said first dielectric layer, and a second end of said at least one delay element is operatively coupled to said second conductive patch element with a second conductive interconnection through said second dielectric layer.

28. An antenna as recited in claim 27, wherein said at least one delay element comprises a loop portion, and said loop portion is at least partially shadowed by said first and second conductive patch elements.

29. An antenna as recited in claim 27, further comprising a conductive layer interposed between said second surface of said first dielectric layer and said second surface of said second dielectric layer, wherein said conductive layer is insulated from said at least one delay element.

30. An antenna as recited in claim 2, wherein said at least one dielectric layer comprises at least first, second and third dielectric layers, said first surface of said at least one dielectric layer comprises a first surface of said first dielectric layer, said second surface of said at least one dielectric layer comprises a first surface of said second dielectric layer, said third dielectric layer is interposed between said first and second dielectric layers, further comprising a conductive layer interposed between said second and third dielectric layers, wherein said at least one delay element comprises at least one transmission line interposed between a second surface of said first dielectric layer and said third dielectric layer, a first end of said at least one delay element is operatively coupled to said first conductive patch element with a first conductive interconnection through said first dielectric layer, a second end of said at least one delay element is operatively coupled to said second conductive patch element with a second conductive interconnection through said second and third dielectric layers and through said conductive layer, and said second conductive interconnection is insulated from said conductive layer.

31. An antenna as recited in claim 30, wherein said at least one delay element is at least partially shadowed by said first and second conductive patch elements.

32. An antenna as recited in claim 2, wherein said at least one dielectric layer comprises at least first, second, third and fourth dielectric layers, said first surface of said at least one dielectric layer comprises a first surface of said first dielectric layer, said second surface of said at least one dielectric layer comprises a first surface of said second dielectric layer, said third dielectric layer is interposed between said first and second dielectric layers, said fourth dielectric layer is interposed between said third and second dielectric layers, further comprising a conductive layer interposed between said third and fourth dielectric layers, wherein said at least one delay element comprises first and second transmission lines, said first transmission line is interposed between said first and third dielectric layers, said second transmission line is interposed between said second and fourth dielectric layers, a first end of said first transmission line is operatively coupled to said first conductive patch element with a first conductive interconnection through said first dielectric layer, a first end of said second transmission line is operatively coupled to said second conductive patch element with a second conductive interconnection through said second dielectric layer, second ends of said first and second transmission lines are operatively coupled to one another with a third conductive interconnection through said third and fourth dielectric layers and through said conductive layer, and said third conductive interconnection is insulated from said conductive layer.

33. An antenna as recited in claim 32, wherein said at least one delay element is at least partially shadowed by said first and second conductive patch elements.

34. An antenna as recited in claim 2, wherein at least one of said first and second conductive patch elements comprises either a circular shape, a rectangular shape, a square shape, a triangular shape, a pentagonal shape, a hexagonal shape, or a polygonal shape.

35. An antenna as recited in claim 2, wherein said delay period for each of said plurality of electromagnetic lens elements in said discrete lens array is adapted with respect to a corresponding plurality of locations of said plurality of electromagnetic lens elements in said discrete lens array so that said discrete lens array emulates a dielectric electromagnetic lens selected from an at least partially spherical dielectric electromagnetic lens, an at least partially cylindrical dielectric electromagnetic lens, an at least partially elliptical dielectric electromagnetic lens, and an at least partially rotational dielectric electromagnetic lens.

36. An antenna as recited in claim 1, wherein said discrete lens array comprises a plurality of electromagnetic lens elements, wherein each electromagnetic lens element of said plurality of electromagnetic lens elements comprises: a conductive layer; a conductive patch element; at least one dielectric layer interposed between said conductive patch element and said conductive layer, and at least one delay element operative between said conductive patch element and said conductive layer.

37. An antenna as recited in claim 36, wherein said at least one delay element comprises at least one transmission line that operates in cooperation with said at least one dielectric layer, a first end of said at least one transmission line is operatively coupled to said conductive patch element, a second end of said at least one transmission line is operatively coupled to said conductive layer, and said at least one transmission line comprises a conductive interconnection through said at least one dielectric layer.

38. An antenna as recited in claim 36, wherein a delay period for each of said plurality of electromagnetic lens elements of said discrete lens array is adapted with respect to a corresponding plurality of locations of said plurality of electromagnetic lens elements of said discrete lens array so that said discrete lens array emulates a dielectric electromagnetic lens selected from an at least partially spherical dielectric electromagnetic lens, an at least partially cylindrical dielectric electromagnetic lens, an at least partially elliptical dielectric electromagnetic lens, and an at least partially rotational dielectric electromagnetic lens.

* * * * *